US011483853B2

(12) United States Patent
Hande et al.

(10) Patent No.: US 11,483,853 B2
(45) Date of Patent: Oct. 25, 2022

(54) TECHNIQUES FOR BUFFERING A FILE

(71) Applicant: QUALCOMM Incorporated, San Diego, CA (US)

(72) Inventors: Prashanth Haridas Hande, San Diego, CA (US); Wanshi Chen, San Diego, CA (US); Linhai He, San Diego, CA (US); Naga Bhushan, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/943,650

(22) Filed: Jul. 30, 2020

(65) Prior Publication Data

US 2021/0037559 A1 Feb. 4, 2021

Related U.S. Application Data

(60) Provisional application No. 62/881,717, filed on Aug. 1, 2019.

(51) Int. Cl.
*H04W 72/12* (2009.01)
*H04L 1/20* (2006.01)
(Continued)

(52) U.S. Cl.
CPC ......... *H04W 72/1284* (2013.01); *H04L 1/203* (2013.01); *H04L 67/06* (2013.01);
(Continued)

(58) Field of Classification Search
CPC ......... H04W 72/1284; H04W 28/0278; H04W 28/06; H04W 72/0413; H04W 72/1263;
(Continued)

(56) References Cited

U.S. PATENT DOCUMENTS

2007/0162649 A1* 7/2007 Wang ................. G06F 13/34
710/22
2010/0135166 A1* 6/2010 Ahluwalia ............. H04L 47/14
370/252

(Continued)

FOREIGN PATENT DOCUMENTS

WO WO-2016153820 A1 9/2016

OTHER PUBLICATIONS

International Search Report and Written Opinion—PCT/US2020/044439—ISA/EPO—dated Oct. 20, 2020.

*Primary Examiner* — Afshawn M Towfighi
(74) *Attorney, Agent, or Firm* — Qualcomm Incorporated

(57) ABSTRACT

Methods, systems, and devices for wireless communications are described for identifying a file having a set of packets that are configured to be processed together. The base station may determine a segmentation scheme for the file based on a size of the file and identify a batch of assignments for communicating the file via a batch of transmissions based on the segmentation scheme. The base station may communicate the file via the batch of transmissions with a user equipment (UE) during the batch of assignments. Additional techniques are described herein for a UE to identify that the UE is storing a file in a buffer at the UE. The UE may transmit an indication to the base station that the buffer includes the file. In some cases, the UE may indicate a size of the file.

28 Claims, 21 Drawing Sheets

(51) Int. Cl.
*H04L 67/06* (2022.01)
*H04W 28/02* (2009.01)
*H04W 28/06* (2009.01)
*H04W 72/04* (2009.01)

(52) U.S. Cl.
CPC ....... *H04W 28/0278* (2013.01); *H04W 28/06* (2013.01); *H04W 72/0413* (2013.01); *H04W 72/1263* (2013.01)

(58) Field of Classification Search
CPC ........... H04W 28/065; H04W 72/1242; H04L 1/203; H04L 67/06
See application file for complete search history.

(56) References Cited

U.S. PATENT DOCUMENTS

| | | | |
|---|---|---|---|
| 2016/0285775 | A1* | 9/2016 | Damnjanovic ... H04W 28/0278 |
| 2017/0295591 | A1* | 10/2017 | Nguyen ................ H04W 28/08 |
| 2017/0359749 | A1 | 12/2017 | Dao |
| 2019/0053260 | A1 | 2/2019 | Shaheen |
| 2020/0389915 | A1* | 12/2020 | Sundararajan ........ H04W 72/14 |
| 2021/0100001 | A1* | 4/2021 | Höglund ........... H04W 72/0493 |
| 2021/0360731 | A1* | 11/2021 | He .................... H04W 72/0493 |

* cited by examiner

TECHNIQUES FOR BUFFERING A FILE

CROSS REFERENCE

The present application for patent claims the benefit of U.S. Provisional Patent Application No. 62/881,717 by HANDE et al., entitled "TECHNIQUES FOR BUFFERING A FILE," filed Aug. 1, 2019, assigned to the assignee hereof, and expressly incorporated by reference herein.

BACKGROUND

The following relates generally to wireless communications, and more specifically to techniques for buffering a file which includes a group of packets configured to be processed together.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE). Some wireless communications systems (for example, NR systems), may support high throughput and low latency communications. Some techniques for supporting high throughput and low latency communications, however, may be improved.

SUMMARY

The described techniques relate to improved methods, systems, devices, and apparatuses that support techniques for buffering a file—a group of packets configured to be processed together. Generally, the described techniques provide for buffering an extended reality (XR) file of an XR application. A user equipment (UE) in a wireless communications system, such as a New Radio (NR) system or a Long Term Evolution (LTE) system, may support applications associated with high throughput and low latency. Specifically, wireless communications systems supporting XR applications may be associated with a high data rate requirement and a tight delay budget. In some example XR applications, one or more transmitted packets may be in the form of groups or files. The possible size for a file may vary. For example, a file may be tens of kilobytes or hundreds of kilobytes. Additionally, a transmitting device may have multiple files pending for transmission. While a base station may have file information for transmitting downlink files to a UE, the base station may not have file information for receiving uplink files. Therefore, the base station may not know how many files the UE has pending for an uplink transmission or size information for the files. Wireless communications systems described herein provide support for a UE to report whether there are any pending uplink files for transmission and any size information for the pending uplink files. In some cases, the UE may report information for a pending uplink file by transmitting a scheduling request. A file-based scheduling request may be jointly encoded with a non-file based scheduling request. In some examples, the UE may report information for a pending uplink file by transmitting a buffer status report (BSR). The BSR may indicate how many pending uplink files are stored in the buffer at the UE. In some cases, the BSR may indicate a size for each of the files.

In some cases, there may be a limit to a size of a transmission. For example, a maximum transmission size may be based on channel conditions, a bandwidth size for the communications, cell loading conditions, etc. If there is a maximum possible transmission size, a file may be segmented into a batch of transmissions. Segmentation techniques for segmenting a file into a batch of transmissions are described herein. Additionally, techniques for identifying a batch of resource assignments for transmitting the batch of transmissions are described. The UE and base station may then communicate the batch of transmissions on the batch of resource assignments based on the segmentation scheme. For example, if the pending file is an uplink file, the UE may segment the file and transmit the batch of transmissions to the base station. If the pending file is a downlink file, the base station may segment the file and transmit the batch of transmissions to the UE.

A method of wireless communication at a UE is described. The method may include identifying that the UE includes in a buffer a file having a set of uplink packets that are configured to be processed together, transmitting an indication to a base station that the buffer includes the file, and transmitting, to the base station, the file via a batch of transmissions according to a resource allocation scheme for the batch of transmissions.

An apparatus for wireless communication at a UE is described. The apparatus may include a processor, memory coupled with the processor, and instructions stored in the memory. The instructions may be executable by the processor to cause the apparatus to identify that the UE includes in a buffer a file having a set of uplink packets that are configured to be processed together, transmit an indication to a base station that the buffer includes the file, and transmit, to the base station, the file via a batch of transmissions according to a resource allocation scheme for the batch of transmissions.

Another apparatus for wireless communication at a UE is described. The apparatus may include means for identifying that the UE includes in a buffer a file having a set of uplink packets that are configured to be processed together, transmitting an indication to a base station that the buffer includes the file, and transmitting, to the base station, the file via a batch of transmissions according to a resource allocation scheme for the batch of transmissions.

A non-transitory computer-readable medium storing code for wireless communication at a UE is described. The code may include instructions executable by a processor to identify that the UE includes in a buffer a file having a set of uplink packets that are configured to be processed together, transmit an indication to a base station that the buffer includes the file, and transmit, to the base station, the file via a batch of transmissions according to a resource allocation scheme for the batch of transmissions.

In some examples of the method, apparatuses, and non-transitory computer-readable medium described herein, transmitting the indication may include operations, features, means, or instructions for transmitting a scheduling request indicating that the file may be stored in the buffer.

Some examples of the method, apparatuses, and non-transitory computer-readable medium described herein may further include operations, features, means, or instructions for jointly encoding the scheduling request with a non-file based scheduling request.

In some examples of the method, apparatuses, and non-transitory computer-readable medium described herein, the non-file based scheduling request indicates a separate uplink transmission, where the separate uplink transmission may be pending transmission.

Some examples of the method, apparatuses, and non-transitory computer-readable medium described herein may further include operations, features, means, or instructions for multiplexing the scheduling request with one or more additional scheduling requests.

In some examples of the method, apparatuses, and non-transitory computer-readable medium described herein, the scheduling request may have a higher priority than the one or more additional scheduling requests.

In some examples of the method, apparatuses, and non-transitory computer-readable medium described herein, transmitting the indication may include operations, features, means, or instructions for transmitting a buffer status report indicating that the file may be stored in the buffer.

In some examples of the method, apparatuses, and non-transitory computer-readable medium described herein, the buffer status report indicates a size of the file.

Some examples of the method, apparatuses, and non-transitory computer-readable medium described herein may further include operations, features, means, or instructions for indicating a total number of a set of buffered uplink files at the UE and a corresponding file size for each of the set of buffered uplink files.

Some examples of the method, apparatuses, and non-transitory computer-readable medium described herein may further include operations, features, means, or instructions for indicating a total size of buffered uplink transmissions at the UE, where the size of the file may be a portion of the total size of buffered uplink transmissions.

In some examples of the method, apparatuses, and non-transitory computer-readable medium described herein, the buffer status report further indicates a non-file based uplink transmission.

Some examples of the method, apparatuses, and non-transitory computer-readable medium described herein may further include operations, features, means, or instructions for detecting a trigger to transmit the indication to the base station, where the indication may be transmitted based on detecting the trigger.

A method of wireless communication at a base station is described. The method may include receiving an indication that a UE includes, in a buffer, a file having a set of uplink packets that are configured to be processed together and receiving, from the UE, the file via a batch of transmissions according to a resource allocation scheme for the batch of transmissions.

An apparatus for wireless communication at a base station is described. The apparatus may include a processor, memory coupled with the processor, and instructions stored in the memory. The instructions may be executable by the processor to cause the apparatus to receive an indication that a UE includes, in a buffer, a file having a set of uplink packets that are configured to be processed together and receive, from the UE, the file via a batch of transmissions according to a resource allocation scheme for the batch of transmissions.

Another apparatus for wireless communication at a base station is described. The apparatus may include means for receiving an indication that a UE includes, in a buffer, a file having a set of uplink packets that are configured to be processed together and receiving, from the UE, the file via a batch of transmissions according to a resource allocation scheme for the batch of transmissions.

A non-transitory computer-readable medium storing code for wireless communication at a base station is described. The code may include instructions executable by a processor to receive an indication that a UE includes, in a buffer, a file having a set of uplink packets that are configured to be processed together and receive, from the UE, the file via a batch of transmissions according to a resource allocation scheme for the batch of transmissions.

In some examples of the method, apparatuses, and non-transitory computer-readable medium described herein, receiving the indication may include operations, features, means, or instructions for receiving a scheduling request indicating that the file may be stored in the buffer.

Some examples of the method, apparatuses, and non-transitory computer-readable medium described herein may further include operations, features, means, or instructions for identifying that the scheduling request may be jointly encoded with a non-file based scheduling request, and decoding the scheduling request based on the joint encoding.

In some examples of the method, apparatuses, and non-transitory computer-readable medium described herein, the non-file based scheduling request indicates a separate uplink transmission, where the separate uplink transmission may be pending transmission.

Some examples of the method, apparatuses, and non-transitory computer-readable medium described herein may further include operations, features, means, or instructions for determining the scheduling request may be multiplexed with one or more additional scheduling requests, and decoding the scheduling request based on the multiplexing.

In some examples of the method, apparatuses, and non-transitory computer-readable medium described herein, the scheduling request may have a higher priority than the one or more additional scheduling requests.

In some examples of the method, apparatuses, and non-transitory computer-readable medium described herein, receiving the indication may include operations, features, means, or instructions for receiving a buffer status report indicating that the file may be stored in the buffer.

In some examples of the method, apparatuses, and non-transitory computer-readable medium described herein, the buffer status report indicates a size of the file.

Some examples of the method, apparatuses, and non-transitory computer-readable medium described herein may further include operations, features, means, or instructions for identifying, based on the buffer status report, a total number of a set of buffered uplink files at the UE and a corresponding file size for each of the set of buffered uplink files.

Some examples of the method, apparatuses, and non-transitory computer-readable medium described herein may further include operations, features, means, or instructions for identifying a total size of buffered uplink transmissions at the UE based on the buffer status report, where the size of the file may be a portion of the total size of buffered uplink transmissions.

In some examples of the method, apparatuses, and non-transitory computer-readable medium described herein, the buffer status report further indicates a non-file based uplink transmission.

A method of wireless communications at a base station is described. The method may include identifying a file having a set of packets that are configured to be processed together, determining a segmentation scheme for the file based on a size of the file, identifying a batch of assignments for communicating the file via a batch of transmissions based on the segmentation scheme, and communicating the file via the batch of transmissions with the UE during the batch of assignments.

An apparatus for wireless communications at a base station is described. The apparatus may include a processor, memory coupled with the processor, and instructions stored in the memory. The instructions may be executable by the processor to cause the apparatus to identify a file having a set of packets that are configured to be processed together, determine a segmentation scheme for the file based on a size of the file, identify a batch of assignments for communicating the file via a batch of transmissions based on the segmentation scheme, and communicate the file via the batch of transmissions with the UE during the batch of assignments.

Another apparatus for wireless communications at a base station is described. The apparatus may include means for identifying a file having a set of packets that are configured to be processed together, determining a segmentation scheme for the file based on a size of the file, identifying a batch of assignments for communicating the file via a batch of transmissions based on the segmentation scheme, and communicating the file via the batch of transmissions with the UE during the batch of assignments.

A non-transitory computer-readable medium storing code for wireless communications at a base station is described. The code may include instructions executable by a processor to identify a file having a set of packets that are configured to be processed together, determine a segmentation scheme for the file based on a size of the file, identify a batch of assignments for communicating the file via a batch of transmissions based on the segmentation scheme, and communicate the file via the batch of transmissions with the UE during the batch of assignments.

Some examples of the method, apparatuses, and non-transitory computer-readable medium described herein may further include operations, features, means, or instructions for identifying one or more channel rate adaptation parameters, where the segmentation scheme may be based on the one or more channel rate adaptation parameters.

In some examples of the method, apparatuses, and non-transitory computer-readable medium described herein, the one or more channel rate adaptation parameters may be based on a target block error rate (BLER) for the file, a channel bandwidth, mobility of the UE, channel state information (CSI), or any combination thereof.

Some examples of the method, apparatuses, and non-transitory computer-readable medium described herein may further include operations, features, means, or instructions for determining a maximum transmission size for communicating the file, and determining, based on the maximum transmission size, a maximum segment size for the batch of assignments to transmit a segment of the file.

In some examples of the method, apparatuses, and non-transitory computer-readable medium described herein, the batch of assignments span a set of slots.

In some examples of the method, apparatuses, and non-transitory computer-readable medium described herein, communicating the file further may include operations, features, means, or instructions for communicating an initial repetition of the file during an initial slot of the set of slots, and communicating one or more additional repetitions of the file during a corresponding one or more additional slots of the set of slots.

In some examples of the method, apparatuses, and non-transitory computer-readable medium described herein, the file may be communicated in a single transport block spanning the set of slots.

In some examples of the method, apparatuses, and non-transitory computer-readable medium described herein, communicating the file further may include operations, features, means, or instructions for communicating a first segment of the file in a first assignment of the batch of assignments, and communicating one or more additional segments of the file in a corresponding one or more additional assignments of the batch of assignments.

Some examples of the method, apparatuses, and non-transitory computer-readable medium described herein may further include operations, features, means, or instructions for communicating a hybrid automatic repeat request (HARQ) feedback transmission including feedback for each segment of the file.

In some examples of the method, apparatuses, and non-transitory computer-readable medium described herein, the batch of assignments span a set of component carriers.

In some examples of the method, apparatuses, and non-transitory computer-readable medium described herein, communicating the file further may include operations, features, means, or instructions for communicating the file as a single transport block over the set of component carriers.

Some examples of the method, apparatuses, and non-transitory computer-readable medium described herein may further include operations, features, means, or instructions for identifying a system loading for the base station, where the segmentation scheme may be based on the system loading.

In some examples of the method, apparatuses, and non-transitory computer-readable medium described herein, the segmentation scheme may be based on a cell load of the base station at one or more slots corresponding to the batch of assignments.

In some examples of the method, apparatuses, and non-transitory computer-readable medium described herein, the segmentation scheme may be based on maintaining an even cell load when communicating the file.

Some examples of the method, apparatuses, and non-transitory computer-readable medium described herein may further include operations, features, means, or instructions for identifying a quality of service identifier for the file, where the segmentation scheme may be based on the quality of service identifier.

In some examples of the method, apparatuses, and non-transitory computer-readable medium described herein, the segmentation scheme may be based on a delay budget for the file, a transmission of the batch of transmissions, a packet of a transmission, or a combination thereof.

In some examples of the method, apparatuses, and non-transitory computer-readable medium described herein, communicating the file may include operations, features, means, or instructions for transmitting the batch of transmissions during the batch of assignments, where the file may be a downlink transmission.

Some examples of the method, apparatuses, and non-transitory computer-readable medium described herein may further include operations, features, means, or instructions for transmitting downlink control information to schedule the batch of assignments, and indicating the segmentation scheme based on the scheduling.

Some examples of the method, apparatuses, and non-transitory computer-readable medium described herein may further include operations, features, means, or instructions for scheduling a set of transport blocks based on a configured grant transmission scheme, where the file may be transmitted in the set of transport blocks.

In some examples of the method, apparatuses, and non-transitory computer-readable medium described herein, each transport block of the set of transport blocks may have a same transport block size.

In some examples of the method, apparatuses, and non-transitory computer-readable medium described herein, each transport block of the set of transport blocks may have a different transport block size.

In some examples of the method, apparatuses, and non-transitory computer-readable medium described herein, a transport block size for the file may be based on a resource size of the batch of assignments, a modulation and coding scheme, or a combination thereof.

In some examples of the method, apparatuses, and non-transitory computer-readable medium described herein, communicating the file may include operations, features, means, or instructions for receiving the batch of transmissions during the batch of assignments, where the file may be an uplink transmission.

Some examples of the method, apparatuses, and non-transitory computer-readable medium described herein may further include operations, features, means, or instructions for indicating the segmentation scheme to the UE.

Some examples of the method, apparatuses, and non-transitory computer-readable medium described herein may further include operations, features, means, or instructions for transmitting, to the UE, downlink control information to schedule batch of assignments, where the downlink control information indicates that the batch of assignments may be configured for the file.

Some examples of the method, apparatuses, and non-transitory computer-readable medium described herein may further include operations, features, means, or instructions for transmitting, to the UE, Radio Resource Control signaling to configure the batch of assignments as part of a configured grant scheme, where the batch of assignments may be configured for the file.

DETAILED DESCRIPTION

Figure 1:
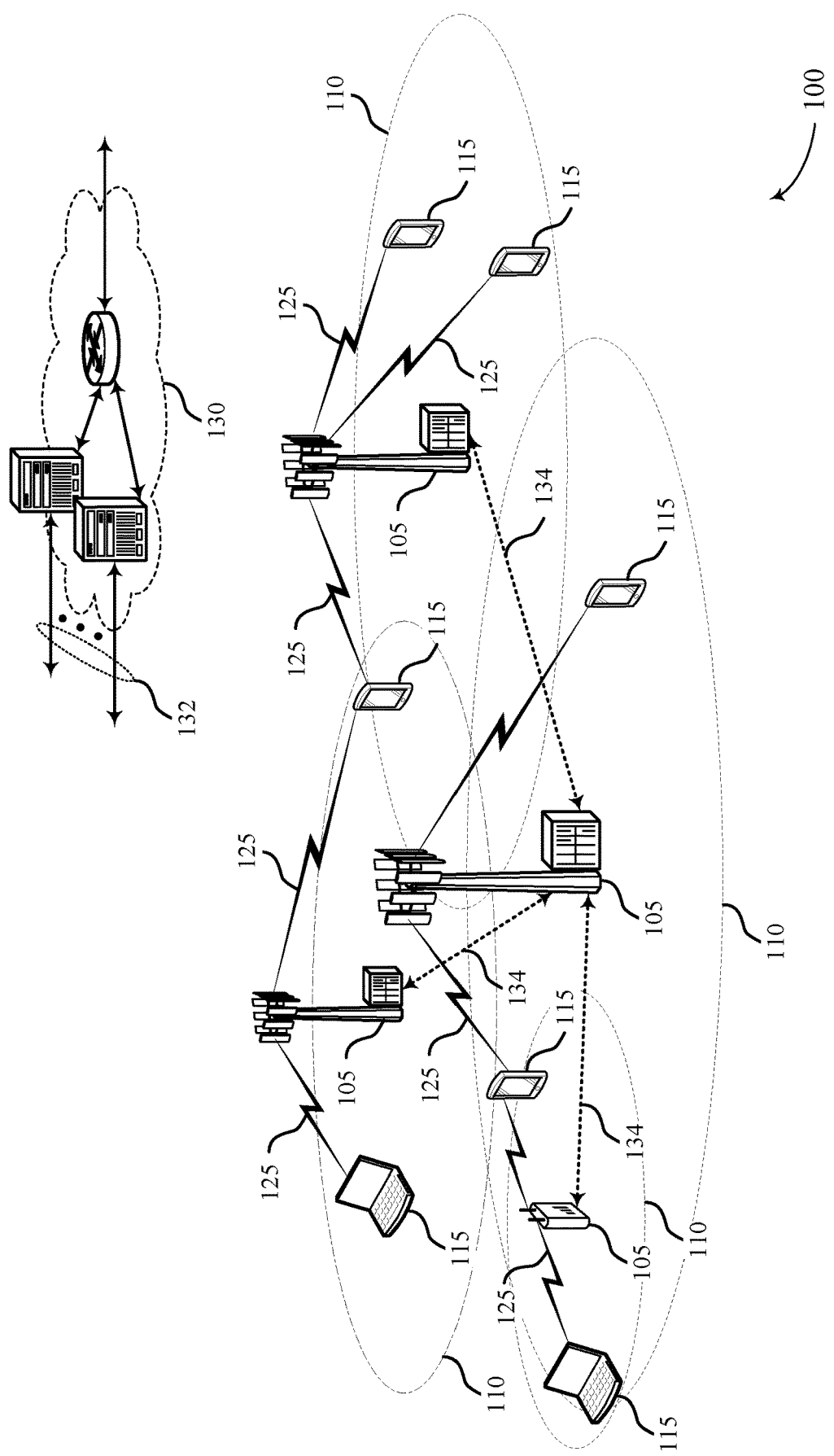
FIG. 1 illustrates an example of a system for wireless communications that supports techniques for buffering a file in accordance with aspects of the present disclosure.

A user equipment (UE) in a wireless communications system, such as a New Radio (NR) system or a Long Term Evolution (LTE) system, may support applications associated with high throughput and low latency. Specifically, wireless communications systems supporting extended reality (XR) applications may be associated with a high data rate requirement and a tight delay budget. In some examples of XR applications, one or more transmitted packets may be in the form of groups or files. As one example, packets in a video frame of an XR application may be included in a file. The packets of a file may be configured to be processed together. For example, a transmitting device may include one or more Internet Protocol (IP) packets in a file if the file (such as a video frame) is usable at a receiver when all IP packets of the file are successfully received.

The possible size of a file may vary. For example, a file may be tens of kilobytes or hundreds of kilobytes. Additionally, a transmitting device may have multiple files pending for transmission. While a base station may have file information for transmitting downlink files to a UE, the base station may not have file information for receiving uplink files. Therefore, the base station may not know how many files the UE has pending for an uplink transmission or size information for the files. Wireless communications systems described herein support techniques for a UE to report whether there are any pending uplink files for transmission and any size information for the pending uplink files. In some cases, the UE may be triggered to report the file information. For example, upon detecting one or more files in the buffer or a threshold size or number of files, the UE may transmit an indication of the file.

In some cases, a UE may report information for a pending uplink file by transmitting a scheduling request. The scheduling request may be used to indicate that the UE has one or more pending files to transmit. A file-based scheduling request may be jointly encoded with a non-file based scheduling request. Or, in some cases, the scheduling request for the file may be separately coded and transmitted with other, non-file based scheduling requests, such as by being multiplexed together. In some examples, the UE may report information for a pending uplink file by transmitting a buffer status report (BSR). The BSR may indicate how many pending uplink files are stored in the buffer at the UE. In some cases, the BSR may indicate a size for each of the files. The BSR may indicate a total size of pending uplink transmissions and also indicate how much of the total size corresponds to file-based transmissions.

In some cases, there may be a limit to a size of a transmission. For example, a maximum transmission size may be based on channel conditions, a bandwidth size for the communications, cell loading conditions, etc. If there is a maximum possible transmission size, a file may be segmented into a batch of transmissions. For example, if a pending downlink file is 12 kilobytes, and the maximum transport block size is 4 kilobytes per physical downlink shared channel (PDSCH) transmission in a slot, a base station may transmit the file using a batch of at least three separate transmissions. Segmentation techniques for segmenting a file into a batch of transmissions are described herein. Additionally, techniques for identifying a batch of resource assignments for transmitting the batch of transmissions are described. The UE and base station may then communicate the batch of transmissions on the batch of resource assignments based on the segmentation scheme. For example, if the pending file is an uplink file, the UE may segment the file and transmit the batch of transmissions to the base station. If the pending file is a downlink file, the base station may segment the file and transmit the batch of transmissions to the UE.

Aspects of the disclosure are initially described in the context of a wireless communications system. Aspects of the disclosure are further illustrated by and described with reference to apparatus diagrams, system diagrams, and flowcharts that relate to techniques for buffering a file.

FIG. 1 illustrates an example of a wireless communications system 100 that supports techniques for buffering a file in accordance with aspects of the present disclosure. The wireless communications system 100 includes base stations 105, UEs 115, and a core network 130. In some examples, the wireless communications system 100 may be a LTE network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, IP connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, the wireless communications system 100 may support applications associated with high throughput and low latency. Specifically, wireless communications systems supporting XR applications may be associated with a high data rate requirement and a tight delay budget. In some examples of XR applications, one or more transmitted packets may be in the form of groups or files. The possible size for a file may vary. For example, a file may be tens of kilobytes or hundreds of kilobytes. Additionally, a transmitting device may have multiple files pending for transmission. While a base station 105 may have file information for transmitting downlink files to a UE 115, the base station 105 may not have file information for receiving uplink files. Therefore, the base station 105 may not know how many files the UE 115 has pending for an uplink transmission or size information for the files.

Wireless communications system 100 may support a UE 115 to report whether there are any pending uplink files for transmission and any size information for the pending uplink files. In some cases, the UE 115 may report information for a pending uplink file by transmitting a scheduling request. A file-based scheduling request may be jointly encoded with a non-file based scheduling request. In some examples, the UE 115 may report information for a pending uplink file by transmitting a BSR. The BSR may indicate how many pending uplink files are stored in the buffer at the UE 115. In some cases, the BSR may indicate a size for each of the files.

In some cases, there may be a limit to a size of a transmission. For example, a maximum transmission size may be based on channel conditions, a bandwidth size for the communications, cell loading conditions, etc. If there is a maximum possible transmission size, a file may be segmented into a batch of transmissions. Segmentation techniques for segmenting a file into a batch of transmissions are described herein. Additionally, techniques for identifying a batch of resource assignments for transmitting the batch of transmissions are described. The UE 115 and base station 105 may then communicate the batch of transmissions on the batch of resource assignments based on the segmentation scheme. For example, if the pending file is an uplink file, the UE 115 may segment the file and transmit the batch of transmissions to the base station 105. If the pending file is a downlink file, the base station 105 may segment the file and transmit the batch of transmissions to the UE 115.

Figure 2:
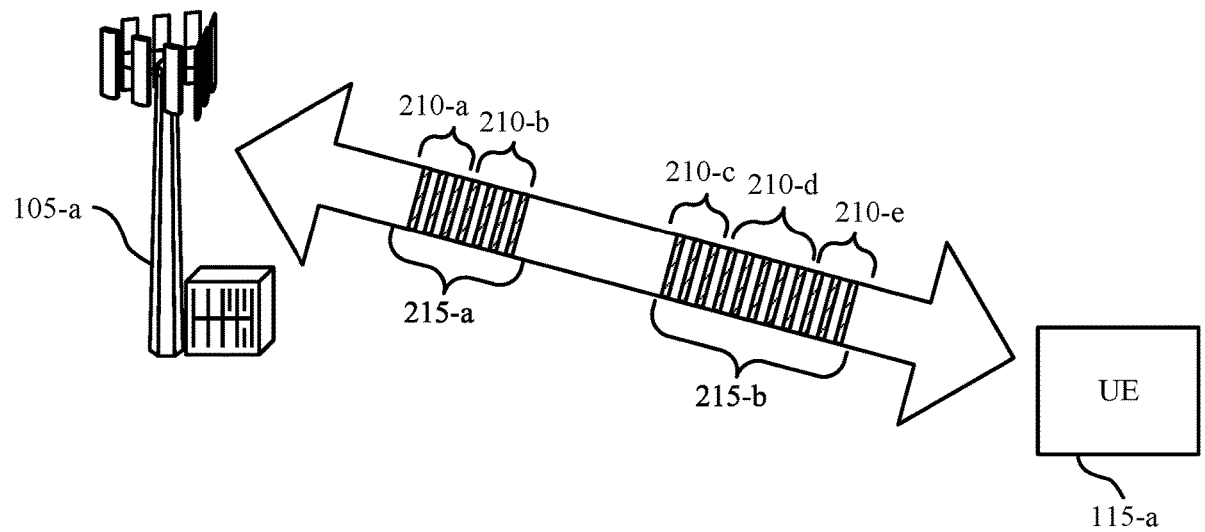
FIG. 2 illustrates an example of a wireless communications system that supports techniques for buffering a file in accordance with aspects of the present disclosure.

FIG. 2 illustrates an example of a wireless communications system 200 that supports techniques for buffering a file in accordance with aspects of the present disclosure. In some examples, wireless communications system 200 may implement aspects of wireless communications system 100. The wireless communications system may include base station 105-*a* and UE 115-*a*, which may be examples of the corresponding devices described with respect to FIG. 1. In one example, base station 105-*a* may be referred to as a transmitter, and UE 115-*a* may be referred to as a receiver. In some implementations, UE 115-*a* and base station 105-*a* may operate in a mmW spectrum and/or using NR technologies.

In some wireless systems (for example, NR wireless systems, such as wireless communications system 200) UE 115-*a* and base station 105-*a* may support low latency and high throughput communications. Different types of communications may entail different traffic thresholds. Table 1 represents a table showing the traffic thresholds for different types of traffic in an NR wireless system. For example, an NR wireless system, such as wireless communications system 200, may support eMBB applications, ultra-reliable low latency communications (URLLC), and XR communications. In some implementations, one or more XR applications (for example, applications using XR traffic thresholds) may include cloud reality applications, virtual reality applications, and gaming applications. As discussed herein, XR applications may be associated with high throughput (for example, throughput for rendering videos) and low latency. In some implementations, XR applications may include interactive video sessions (such as gaming or head mounted display). As described with reference to Table 1, XR applications may be associated with a packet delay budget and a packet error rate. For example, an XR application (or an XR communication session) may be associated with a packet delay budget of 10 ms and a packet error rate of $10^{-6}$.

TABLE 1

| Traffic Type | 5QI Value | Packet Delay Budget | Packet Error Rate | Default Maximum Data Burst Volume | Example Services |
|---|---|---|---|---|---|
| eMBB | 1 | 100 ms | $10^{-2}$ | N/A | Conversational voice |
| eMBB | 2 | 150 ms | $10^{-3}$ | N/A | Conversational video (for example, live streaming) |
| eMBB | 6, 8, 9 | 300 ms | $10^{-6}$ | N/A | Video (for example, buffered streaming) Transmission Control Protocol-based service (for example, e-mail, chat, file transfer protocol, peer-to-peer file sharing, progressive video) |
| ... | ... | ... | ... | ... | ... |
| XR | 80 | 10 ms | $10^{-6}$ | N/A | Low latency eMBB applications (such as augmented reality) |
| URLLC | 81 | 5 ms | $10^{-5}$ | 160 B | Remote control |
| ... | ... | ... | ... | ... | ... |

Additionally, Table 2 illustrates multiple use cases for XR applications. For example, an XR application may include virtual reality split rendering (for example, gaming applications). In such implementations, a head mounted display may communicate with a server that renders a video frame. In such examples, processing of the video frame may be performed at the server. Upon successful processing of the video frame, a communication link (such as a 5G communication link) may convey the processed video frame from the server to the head mounted display. For successful delivery of the processed video frame, the communication link may be associated with high throughput and low latency (for example, traffic threshold for XR applications). A second use case for XR applications may include augmented reality split computation. In augmented reality applications, an entire view of a user may not be covered by a rendered video. Instead, a rendered video (such as, video rendered from a server) may be augmented over a display of a user device (for example, a camera feed). A third use case for XR applications may include cloud gaming. In some examples, cloud gaming may be associated with high throughput and low latency communication link. Thus, XR applications may be subjected to higher traffic thresholds, so the NR wireless communications system (such as wireless communications system 200) may be aware of traffic associated with XR applications.

TABLE 2

|  | Virtual Reality split rendering | Augmented Reality split computation | Cloud Gaming |
|---|---|---|---|
| Head Mounted Display/Device | Head-mounted with 5G modem attached | Head-mounted with USB/Bluetooth connection to "Puck" or Smartphone with 5G modem | 5G Smartphone or Tablet |
| 5G usage Location | QoS Enterprise-Indoor, Residential-Indoor, Outdoor | QoS Enterprise-Indoor, Outdoor | OTT/QoS Outdoor |
| Mobility | Limited to head movements and restricted body movements, Hi-speed (VR in the back of a car) | Pedestrian, Hi-speed | Static, Hi-speed |

Some existing wireless communications systems may be configured to treat data packets as a stream of bits without the knowledge of files associated with the packets. In some examples of XR applications, one or more transmitted packets may be in the form of groups or files. As one example, packets in a video frame in an XR application may be included in a file. In some examples, the separate files may be associated with a file error rate. For example, a file error rate may be based on a number of packets in each file, a reliability threshold associated with each file (for example, whether a file includes an I-frame or a P-frame), or a combination thereof. Existing wireless communications may not have a method to support or guarantee a file error rate.

According to one or more aspects of the present disclosure, a wireless device of the wireless communications system 200 may be configured to group packets 205 of the same video frame as a file 210 and transmit the files 210 as packet-groups in uplink or downlink communications. For example, base station 105-*a* may transmit an uplink grant to UE 115-*a*. The uplink grant may indicate a transmission mode, such as a first-in first-out mode or a packet-group transmission mode. UE 115-*a* may select one or more packets 205 for transmission in a payload according to the indicated transmission mode.

Traffic flow illustrated in FIG. 2 may include multiple IP packets 205. In some implementations, NR wireless systems (such as the wireless communications system 200 supporting XR applications), or wireless devices of these NR wireless systems, may be configured to group one or more IP packets 205 into one or more files 210. The wireless communications system 200 may support grouping the one or more IP packets 205 based on a reliability threshold, packet delivery deadline, etc. For example, a first group of packets (e.g., file 210-*a*) may be associated with an I-frame, and a second group of packets (e.g., file 210-*b*) may be associated with a P-frame. In such an example, the first group of packets may have a higher reliability threshold (such as a high priority) than the second group of packets. Additionally, or alternatively, the wireless communications system may group the one or more IP packets 205 based on a delivery deadline associated with each IP packet 205. In some implementations, a delivery deadline of a packet 205 may be interpreted as a sum of a time of arrival of the packet (for example, at a base station 105) and a packet delay budget associated with the packet. In some examples, a group of packets having a same (or similar) delivery deadline may be grouped together as one file 210. In some examples, the wireless communications system 200 may implement additional signaling to convey information related to a delivery deadline or a packet delay budget from an application to base station 105-*a* and UE 115-*a*.

In some implementations, the wireless communications system may group the one or more IP packets 205 based on a policy of file handling. For example, the wireless communications system may include one or more IP packets 205 in a file if the file (such as a video frame) is usable at a receiver (such as UE 115-*a*) when all IP packets of a file 210 are successfully received. In some examples, the wireless communications system 200 may include one or more IP packets 205 in a file if the policy indicates that a continuous stream of IP packets 205 up to the first packet in error can be used at the receiver.

In an example shown by FIG. 2, the wireless communications system 200 generates 5 files. In some implementations, each file may include a set of IP packets 205 jointly processed by an application (such as an XR application). In some examples, the wireless communications system 200 may determine the IP packets 205 associated with a file based on a maximum transmission unit (MTU) setting on an IP stack interfacing with the application. In some examples, the wireless communications system 200 may further fragment the IP packets 205 into smaller IP packet fragments (not shown). In some implementations, a burst 215 of files may be referred to as files generated by an application at the same (or similar) time. As depicted in the example of FIG. 2, a transmitting wireless device of the wireless communications system 200 generates files 210-*a* and 210-*b* at a same (or similar) time. Accordingly, files 210-*a* and 210-*b* are included in a first burst 215-*a* of the traffic flow. Similarly, the transmitting device (for example, for an XR application included in the wireless communications system) may generate a second burst 215-*b* including files 210-*c*, 210-*d*, and 210-*e*.

The possible size for a file 210 may vary. For example, a file 210 may be tens of kilobytes or hundreds of kilobytes. Additionally, a transmitting device may have multiple files pending for transmission. While base station 105-*a* may have file information for transmitting downlink files, base station 105-*a* may not have file information for receiving uplink files. Therefore, base station 105-*a* may not know how many files 210 UE 115-*a* has pending for an uplink transmission or size information for the files. The wireless communications system 200 may therefore support techniques for UE 115-*a* to report whether there are any pending uplink files for transmission and any size information for the pending uplink files. In some cases, UE 115-*a* may be triggered to report the file information. For example, upon detecting one or more files in the buffer, or a threshold size or number of files, UE 115-*a* may transmit an indication of the file.

In some cases, UE 115-*a* may report the pending file information by transmitting a scheduling request. In some examples, a scheduling request may indicate that UE 115-*a* has one or more pending files 210 to transmit. For example, base station 105-*a*, upon receiving the scheduling request, may determine that UE 115-*a* has an uplink file 210 stored in a buffer at UE 115-*a*. Base station 105-*a* may then transmit a downlink grant scheduling resources for UE 115-*a* to transmit the uplink file 210. In some cases, the scheduling request for the file 210 may be jointly encoded with a scheduling request for other, non-file based packets. Or, in some cases, the scheduling request for the file 210 may be separately coded and transmitted with other scheduling requests, such as by being multiplexed together with the other scheduling requests.

A scheduling request for a file 210 may take precedence over other, non-file based scheduling requests. For example, the other, non-file based scheduling requests may be postponed or dropped. Or, in some cases, base station 105-*a* may assign resources for a file 210 before assigning resources for other types of transmissions.

In some examples, UE 115-*a* may report the pending uplink file information by transmitting a buffer status report (BSR). The BSR may, in some cases, indicate a size of the pending uplink transmission. Information included in the BSR for the pending uplink may be separate from information in the BSR for other, non-file packets in the buffer. For example, the BSR may indicate a total size of pending uplink transmissions. In some cases, the BSR may indicate a size of transmission which are configured group or file-based scheduling. In an example, the BSR may indicate a total size of 12 kilobytes pending uplink transmission, of which 7 kilobytes are for file-based transmission. The BSR may, in some cases, indicate a number of files stored in the buffer at UE 115-*a*. For example, UE 115-*a* may transmit the BSR to indicate that there are two files pending uplink transmission. In some examples, the buffer status report may indicate sizes for each of the pending files. For example, UE 115-*a* may indicate 7 kilobytes for pending file-based transmissions, 3 kilobytes of which are for a first file and 4 kilobytes of which are for a second file.

In some cases, the maximum possible transmission size may be limited. For example, the maximum transmission size may be based on channel conditions, a bandwidth size for the communications, cell loading conditions, etc. In some cases, there may be a maximum transmission size for PDSCH, physical uplink shared channel (PUSCH), or both. If there is a maximum possible transmission size, a file may be segmented into multiple transmissions. For example, if a pending downlink file is 12 kilobytes, and the maximum transport block size is 4 kilobytes per PDSCH in a slot, base station 105-*a* may use at least three PDSCH transmissions to complete the transmission of the file. Techniques are described herein to support efficient segmentation schemes to segment a file into one or more transmissions. Some exemplary segmentation techniques are described in more detail with reference to FIG. 3.

In some cases, the wireless communications system 200 may support file-based acknowledgments. In some cases, a file for an XR application may be used at the receiving device if all packets of the application are successfully received. Therefore, a wireless device receiving a file may provide an ACK for the entire file. For example, if a file is transmitted in a batch of three transmissions, the receiving device may provide HARQ feedback for the file based on receiving all three transmissions of the batch. In some cases, the receiving device may also provide per-transport block HARQ feedback. Per-file feedback may reduce the quantity of ACK resources used in the wireless communications system 200, which may improve downlink throughput or increase a number of consecutive downlink TTIs.

Figure 3:
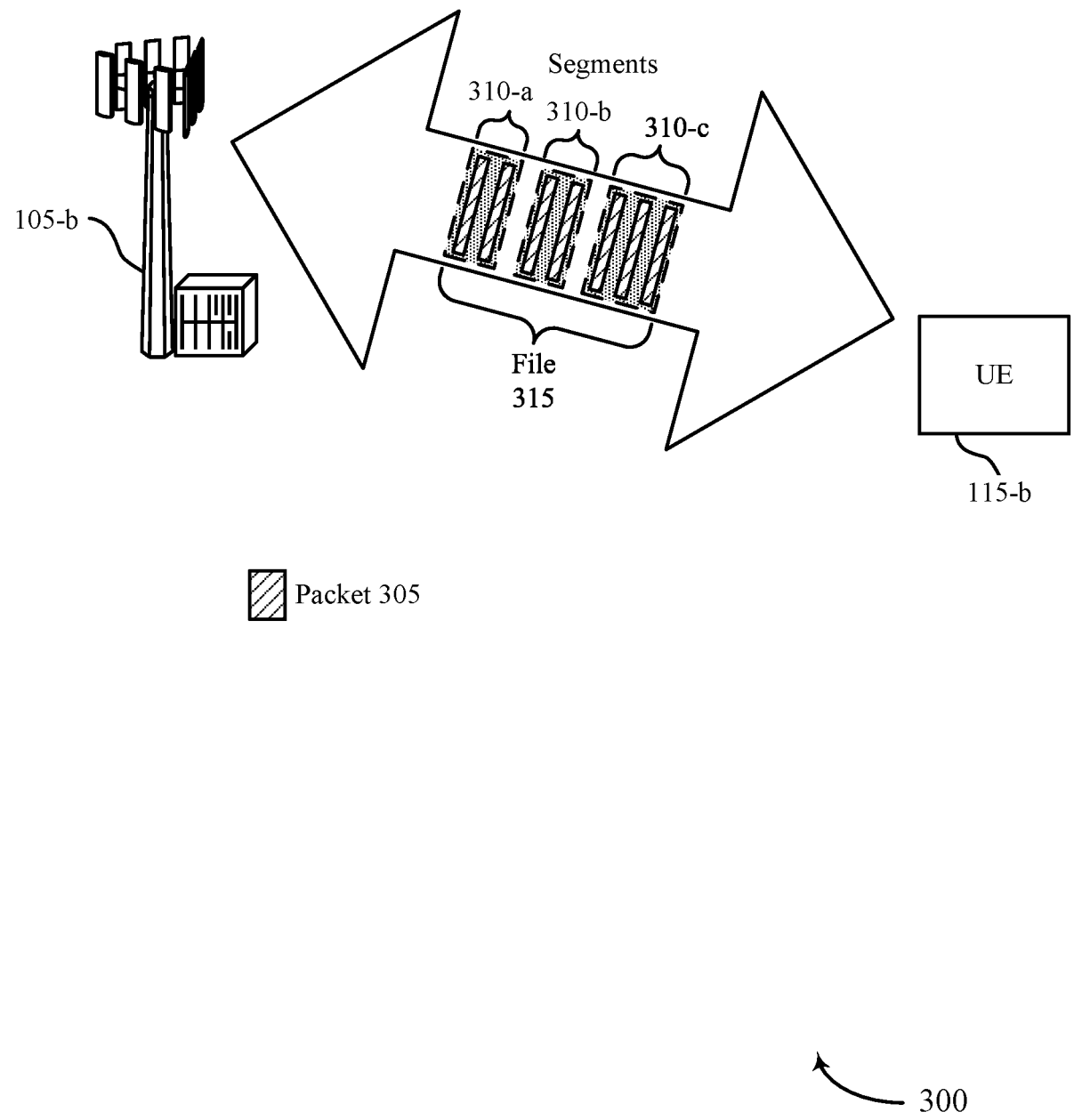
FIG. 3 illustrates examples of segmentation techniques that support techniques for buffering a file in accordance with aspects of the present disclosure.

FIG. 3 illustrates an example of segmentation techniques 300 that support techniques for buffering a file in accordance with aspects of the present disclosure. In some examples, the segmentation techniques 300 may implement aspects of wireless communications system 100. The segmentation techniques 300 may include UE 115-*b* and base station 105-*b*, which may be respective examples of a UE 115 and a base station 105.

UE 115-*b* and base station 105-*b* may support XR communications as described herein. For example, UE 115-*b* and base station 105-*b* communicate a file via a batch of transmissions which are configured to be jointly processed by an application (e.g., an XR application) at a receiving device. In an example, the batch of transmissions 310 may be an example of an uplink file, and UE 115-*b* may generate the batch of transmissions 310 for transmission to base station 105-*b*. The batch of transmissions 310 may include one or more packets 305 which are configured to be jointly processed by base station 105-*a*, such as for an application which is running at base station 105-*b*.

In some examples, there may be a maximum transmission size. For example, the wireless communications system may implement a maximum transport block size per shared channel (e.g., PDSCH or PUSCH) per slot. The maximum transport block size may be based on, for example, cell loading, a bandwidth allocated to the transmitted, channel conditions, etc. In some cases, the maximum transport block size may be configured by the network or may be determined by the devices based on one or more of the parameters described herein. In these examples, if a transmitting device has a batch of transmissions 310 which exceeds the maximum transmission size, the transmitting device may segment the batch of transmissions into one or more smaller transmissions (e.g., transmissions 310-*a*, 310-*b*, and 310-*c*). The transmitting device may then transmit the segmented transmission over multiple shared channel resources.

A segmentation scheme used to segment the file 315 may be based on a size for the file 315. The segmentation scheme may also be based on one or more of a channel rate adaptation, a system loading, and a quality of service (QoS) requirement or indicator for the file 315.

The channel rate adaptation may be determined based on channel state information (CSI), channel bandwidth, mobility, or other factors. The segmentation scheme may be selected to maximize a data rate based on the channel characteristics. For example, the file 315 may be 12 kilobytes. The channel rate adaptation may indicate a maximum capacity of 5 kilobytes per transmission when targeting a 10% BLER for a PDSCH transmission. Therefore, the segmentation scheme may indicate to segment the file 315 into a batch of three transmissions. For example, the transmitting device may segment the file into a first transmission 310-*a* of 5 kilobytes, a second transmission 310-*b* of 5 kilobytes, and a third transmission 310-*c* of 2 kilobytes. Base station 105-*b* may schedule a batch of three assignments for the batch of three transmissions. In some examples, the resource assignments for the batch of transmissions 310 may correspond to or be based on the sizes of the segments.

In another example, base station 105-*a* may schedule a transport block with a larger transport block size that spans enough slots, component carriers, or both, to be able to communicate the file in a single transmission. Instead of scheduling the file on a per-slot basis for three transmissions, base station 105-*a* may schedule a single transmission spanning three slots, three component carriers, or some combination thereof with a transport block size of 12 kilobytes. In this example, code-block-group (CBG) may be enabled so that CBG-based HARQ may be enabled for the file. For example, the transport block may include two or more CBGs. The receiver may then provide HARQ feedback for portions of the transport block by indicating which CBGs were successfully or unsuccessfully received via a CBG-level HARQ response.

In some cases, a transport block which spans two or more slots may be transmitted in repetitions. For example, the repetitions of the transport block may have separate resource mappings per slot with different redundancy versions. In a first slot, the transmitting device may transmit a first repetition of the transport block (e.g., the entire file). In a second slot, the transmitting device may transmit a second repetition of the transport block, but the second repetition may have a different redundancy version. In some examples, the two or more slots may be treated as a single scheduling unit, and the transmitting device may perform resource mapping accordingly. For example, the transmitting device may map the one transport block to resources spanning across the two or more slots.

In some examples, the file may be scheduled as a single transport block over multiple carriers. For example, base station 105-*b* may utilize a mechanism to determine the new transport block size based on one or more of a number of component carriers, a number of slots, a transport block size table, etc.

In some examples, a segmentation scheme for the file 315 may be based on a system loading. For example, the segmentation scheme to divide the file 315 into the batch of transmissions 310 may be based on a system load for uplink or downlink traffic. In an example, the file 315 may be 12 kilobytes large. If the cell load at a current slot (e.g., or a first scheduled slot) is high and 2 kilobytes can be scheduled for UE 115-*b*, then the file 315 may be segmented into a first transmission 310-*a* of 2 kilobytes, a second transmission 310-*b* of 5 kilobytes, and a third transmission 310-*c* of 5 kilobytes. This segmentation scheme may be based on the scheduling of other UEs 115, as many neighboring UEs 115 may be scheduled at the same time as the first transmission 310-*a*. This may cause the total available system bandwidth to be small during the first transmission 310-*a*. In some examples, the segmentation scheme may be determined to maintain a constant load to the file 315 by splitting the file 315 evenly. For example, each transmission (e.g., transmissions 310-*a*, 310-*b*, and 310-*c*) of the batch of transmissions 310 may have a same size. If the file is 12 kilobytes large, the first transmission 310-*a* may be 4 kilobytes, the second transmission 310-*b* may be 4 kilobytes, and the third transmission 310-*c* may be 4 kilobytes.

In some cases, the segmentation scheme for the file 315 may be based on a QoS indicator for the file 315. Files with different QoS types may have different latency or reliability requirements. In some cases, the file 315 may have a delay budget. If the file 315 has, for example, a 10 ms delay budget, the segmentation scheme may segment the file 315 into equal partitions. However, if later packets have a tighter delay budget, then the batch of transmissions 310 may be more frontloaded to have the earlier transmissions 310 be larger. For example, the file may be 12 kilobytes larger, each packet may take at least 1 ms to transmit, the maximum transmission size per shared channel may be 5 kilobytes, and the latter packets may have a tighter delay budget. The segmentation scheme may be determined to segment the file 315 into a first transmission 310-*a* of 4.5 kilobytes, a second transmission 310-*b* or 4 kilobytes, and a third transmission 310-*c* of 3.5 kilobytes.

In an example, base station 105-*b* may have one or more pending downlink files, including at least the file 315. The pending downlink files may be stored in a buffer or in memory at base station 105-*b*. Base station 105-*b* may determine a segmentation scheme for the pending downlink files based on channel rate adaptation, system loading, a QoS requirement for the one or more pending downlink files, or any combination thereof. Base station 105-*b* may determine the segmentations scheme, such as how to segment, and whether to combine the one or more pending downlink files with other packets in the scheduling.

In some examples for a downlink pending file, base station 105-*b* may indicate a set of transport blocks for each PDSCH. For example, base station 105-*b* may indicate the set of transport blocks for each PDSCH when configured for configured grant communications or when a single downlink control information (DCI) schedules multiple packets 305, transmissions 310, or files 315. For example, for a configured grant enabling a configured transmission of multiple transport blocks in a corresponding number of slots, base station 105-*b* may configure either the same transport block size for all of the transport blocks or different transport block sizes for each of the different transport blocks. If a single DCI schedules multiple packets or files, the transport block sizes may be determined based on the resource assignment, MCS, etc., similar to an individual assignment case. For example, if a single DCI schedules four packets, base station 105-*b* may configure the same transport block size for all of the packets, or base station 105-*b* may use the same transport block size for the first two packets and half of that size for the last two packets.

In an example, UE 115-*b* may have one or more pending uplink files. The pending uplink files may be stored in a buffer at UE 115-*b*. In some cases, UE 115-*b* may transmit an indication of the pending uplink files to base station 105-*b*. UE 115-*b* may, in some cases, indicate a number of pending uplink files stored at UE 115-*b*, a size of the files, etc., based on transmitting a scheduling request or a buffer status report. In some cases, base station 105-*b* may determine the segmentation scheme and transmit an indication of the segmentation scheme to UE 115-*b*.

In some examples, such as for dynamic scheduling, base station 105-*b* may indicate whether the scheduled PUSCH is dedicated to or prioritized for file-based packets or not. Base station 105-*b* may transmit this indication as part of DCI, for example by toggling a bit in the DCI. If the scheduled PUSCH is indicated to be dedicated to or prioritized for file-based packets, UE 115-*b* may give the file-based packets highest priority when determining scheduling, resource mapping assignments, transmission order, etc.

For configured-grant uplink transmission, base station 105-*b* may indicate whether the cell group is for file-based transmissions or not. For example, base station 105-*b* may indicate this as part of RRC configuration, activation of the configured grants, or re-activation of the configured grants. When selecting the configured grants for transmitting the one or more pending uplink files, UE 115-*b* may make the selection based on the set of configured grants and the file size. For example, UE 115-*b* may select the configured grant for transmitting the pending uplink file based a packet size that can be supported by each configured grant. The configured grant selection may also be based on one or more of channel conditions, channel bandwidth, uplink load (if indicated), and QoS requirements for the uplink files. In some cases, base station 105-*b* may indicate a preferred segmentation technique or segmentation scheme to UE 115-*b*. For example, base station 105-*b* may indicate to transmit using all available configured grants (e.g., across different component carriers, slots, or both) or to transmit using one configured grant and wait for dynamic scheduling for remaining pending transmissions.

Figure 4:
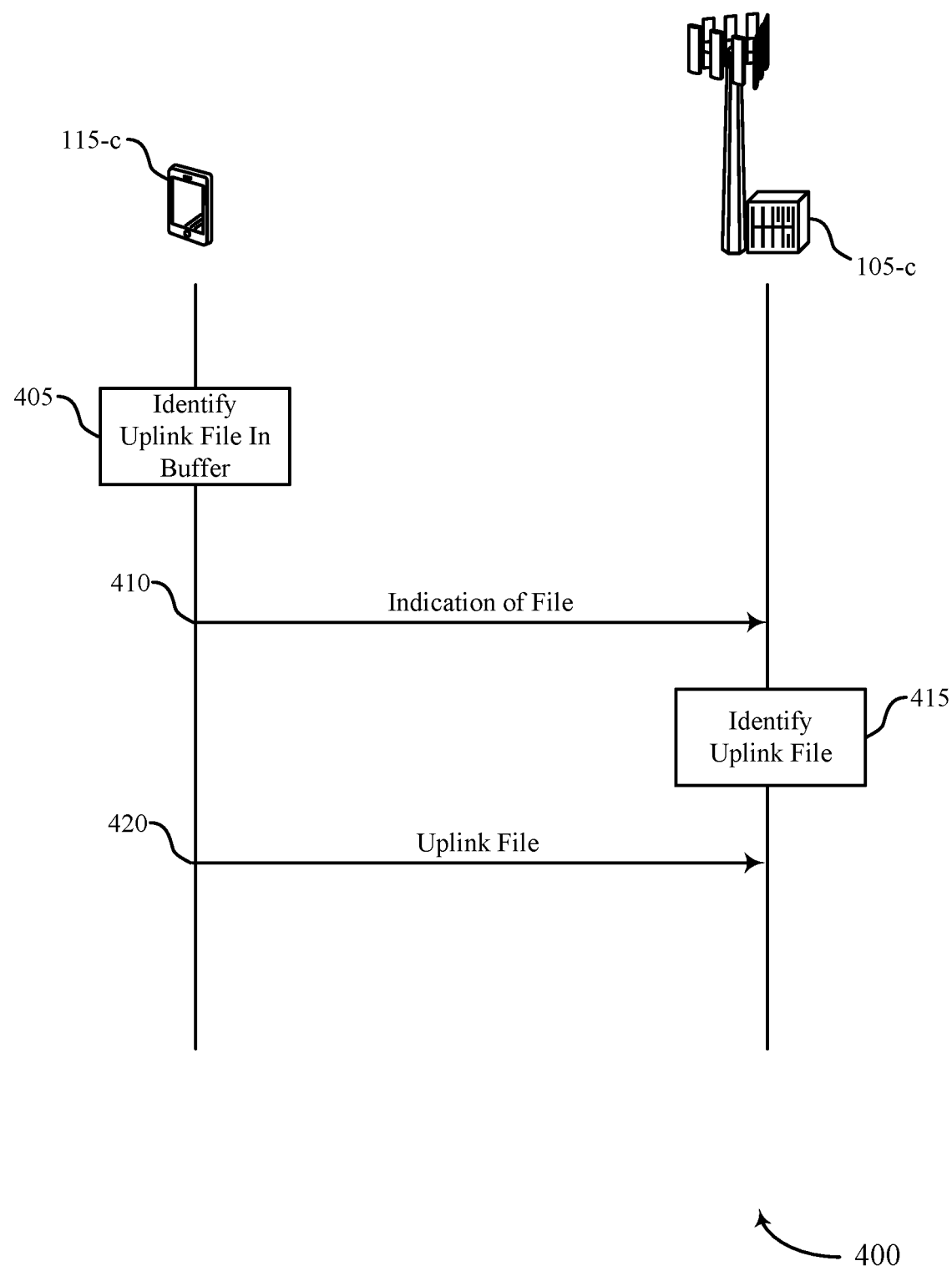
FIG. 4 illustrates an example of a process flow that supports techniques for buffering a file in accordance with aspects of the present disclosure.

FIG. 4 illustrates an example of a process flow 400 that supports techniques for buffering a file in accordance with aspects of the present disclosure. In some examples, the process flow 400 may implement aspects of wireless communications system 100. The process flow 400 includes UE 115-*c* and base station 105-*c*, which may be respective examples of a UE 115 and a base station 105 as described herein.

At 405, UE 115-*c* may identify that UE 115-*c* includes, in a buffer, a file having a set of uplink packets that are configured to be processed together. The file may be, for example, an XR file for an XR application. While UE 115-*c* may know a number of and a size of XR files stored in the buffer, base station 105-*c* may not. Therefore, UE 115-*c* may implement techniques to assist base station 105-*c* in detecting and receiving the uplink files.

UE 115-*c* may transmit an indication to base station 105-*c* that the buffer includes the file at 410. UE 115-*c* may report whether there is at least one uplink file for file-based scheduling and, if so, the file sizes. In some cases, UE 115-*c* may transmit a scheduling request indicating that the file is stored in the buffer. In some cases, the scheduling request may indicate whether or not there exists a file in the buffer or not. For example, the scheduling request may be a low-overhead technique to simply indicate the presence of the file. In some cases, UE 115-*c* may jointly code the file-based SR bit with an SR for indicating other, non-file based packets.

In another example, UE 115-*c* may transmit a BSR indicating that the file is stored in the buffer. UE 115-*c* may indicate a total number of a set of buffered uplink files at the UE. In some cases, UE 115-*c* may indicate a corresponding file size for each of the set of buffered uplink files. In some cases, UE 115-*c* may indicate a total size of buffered uplink transmissions at UE 115-*c*, where the size of the file is a portion of the total size of buffered uplink transmissions. For example, UE 115-*c* may transmit the BSR to indicate that that are 12 kilobytes of data in the buffer, and 7 kilobytes are for file-based scheduling.

At 415, base station 105-*c* may identify that there is a file in the buffer at UE 115-*c*. In some cases, base station 105-*c* may transmit DCI to schedule a batch of assignments for UE 115-*c* to transmit a batch of transmissions for the file. At 420, UE 115-*c* may transmit, to base station 105-*c*, the file via a batch of transmissions according to a resource allocation scheme for the batch of transmissions. The resource allocation scheme may, in some cases, be indicated in the DCI. In some cases, the resource allocation scheme may be based on a segmentation scheme as described herein.

Figure 5:
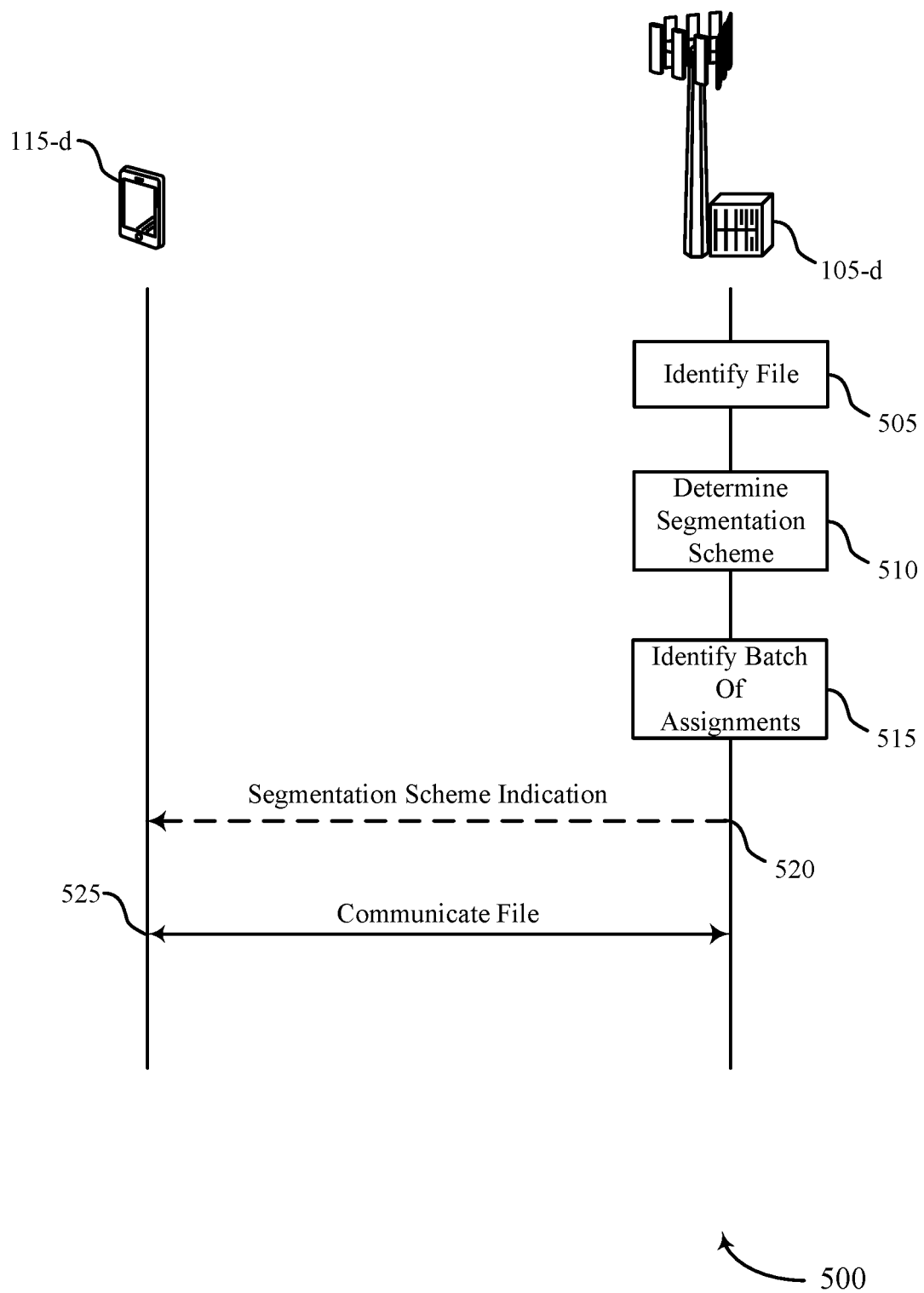
FIG. 5 illustrates an example of a process flow that supports techniques for buffering a file in accordance with aspects of the present disclosure.

FIG. 5 illustrates an example of a process flow 500 that supports techniques for buffering a file in accordance with aspects of the present disclosure. In some examples, the process flow 500 may implement aspects of wireless communications system 100. The process flow 500 includes UE 115-*d* and base station 105-*d*, which may be respective examples of a UE 115 and a base station 105 as described herein.

At 505, base station 105-*d* may identify a file having a group of packets that are configured to be processed together. The file may be an example of an XR file of an XR application. At 510, base station 105-*d* may determine a segmentation scheme for the file based on a size of the file. In some cases, there may be a maximum transmission size. For example, a wireless device may only be able to transmit 5 kilobytes in a slot on a downlink shared channel. If the file exceeds the maximum transmission size, the transmitting device may transmit segments of the file, where the full file is transmitted over the segments.

In some cases, base station 105-*d* may identify one or more channel rate adaptation parameters, where the segmentation scheme is based on the one or more channel rate adaptation parameters. The channel rate adaptation parameters may include, for example, a target BLER for the file, a channel bandwidth, mobility of the UE, CSI, or any combination thereof. In some examples, base station 105-*d* may identify a system loading for base station 105-*d*, where the segmentation scheme may be based on the system loading. For example, the segmentation scheme may be based on a cell load of base station 105-*d* at one or more slots corresponding to the one or more batch of assignments or resource allocations. In some cases, base station 105-*d* may identify a QoS identifier for the file, where the segmentation scheme is based on the QoS identifier. The file, or some packets of the file, may have a target delay budget. Base station 105-*d* may determine the segmentation scheme based on a target delay budget of the file, a transmission of the batch of transmissions, or a packet of the file.

At 515, base station 105-*d* may identify a batch of assignments for communicating the file via a batch of transmissions based on the segmentation scheme. The batch of assignments may correspond to resource assignments to communicate (e.g., transmit or receive) the file via the batch of transmissions. The batch of assignments may, in some cases, span one or more slots, one or more component carriers, or one or more of both. In some cases, at 520, base station 105-*d* may indicate the segmentation scheme to UE 115-*d*.

At 525, UE 115-*d* and base station 105-*d* may communicate the file via the batch of transmissions during the batch of assignments. In some cases, the file may be a downlink file. Base station 105-*d* may transmit the batch of transmissions during the batch of assignments. In another example, the file may be an uplink file. Base station 105-*d* may then receive the batch of transmissions during the batch of assignments. In some cases, base station 105-*d* may indicate the segmentation scheme at 520 if the file is an uplink file. UE 115-*d* may then use the indicated segmentation scheme to segment the file and generate the batch of transmissions.

Figure 6:
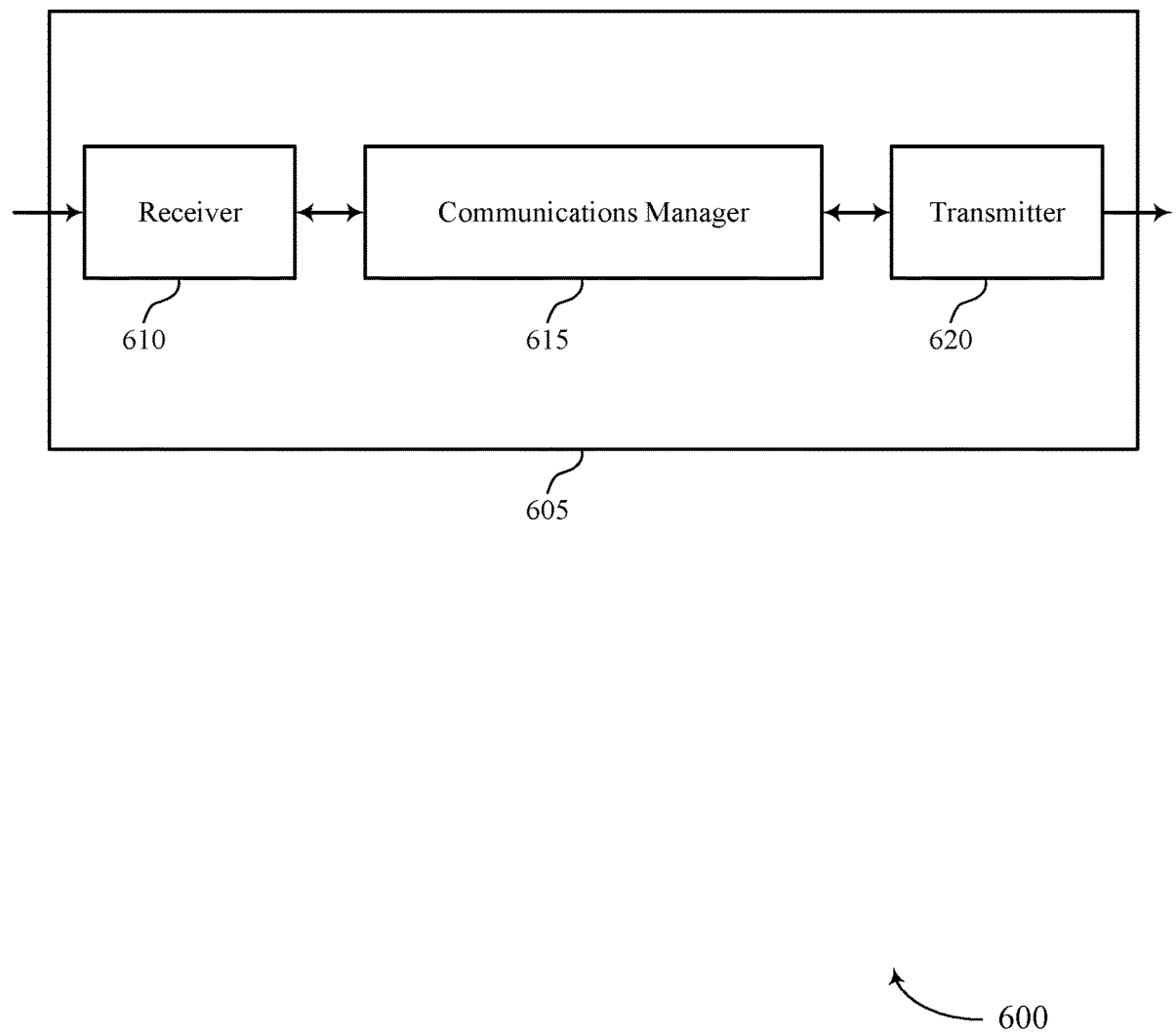
FIGS. 6 and 7 show block diagrams of devices that support techniques for buffering a file in accordance with aspects of the present disclosure.

FIG. 6 shows a block diagram 600 of a device 605 that supports techniques for buffering a file in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for buffering a file, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify that the UE includes in a buffer a file having a set of uplink packets that are configured to be processed together, transmit an indication to a base station that the buffer includes the file, and transmit, to the base station, the file via a batch of transmissions according to a resource allocation scheme for the batch of transmissions. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA), or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 615 as described herein may be implemented to realize one or more potential advantages. One implementation may allow a UE 115 to efficiently segment a file when a size of the file exceeds a network transmission file size restriction. The techniques may enable the UE 115 to consider factors such as cell loading, rate adaptation, and a QoS requirement for the file when segmenting the file. The techniques may support the UE 115 to meet stringent latency and reliability requirements for various types of wireless communications, such as XR.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
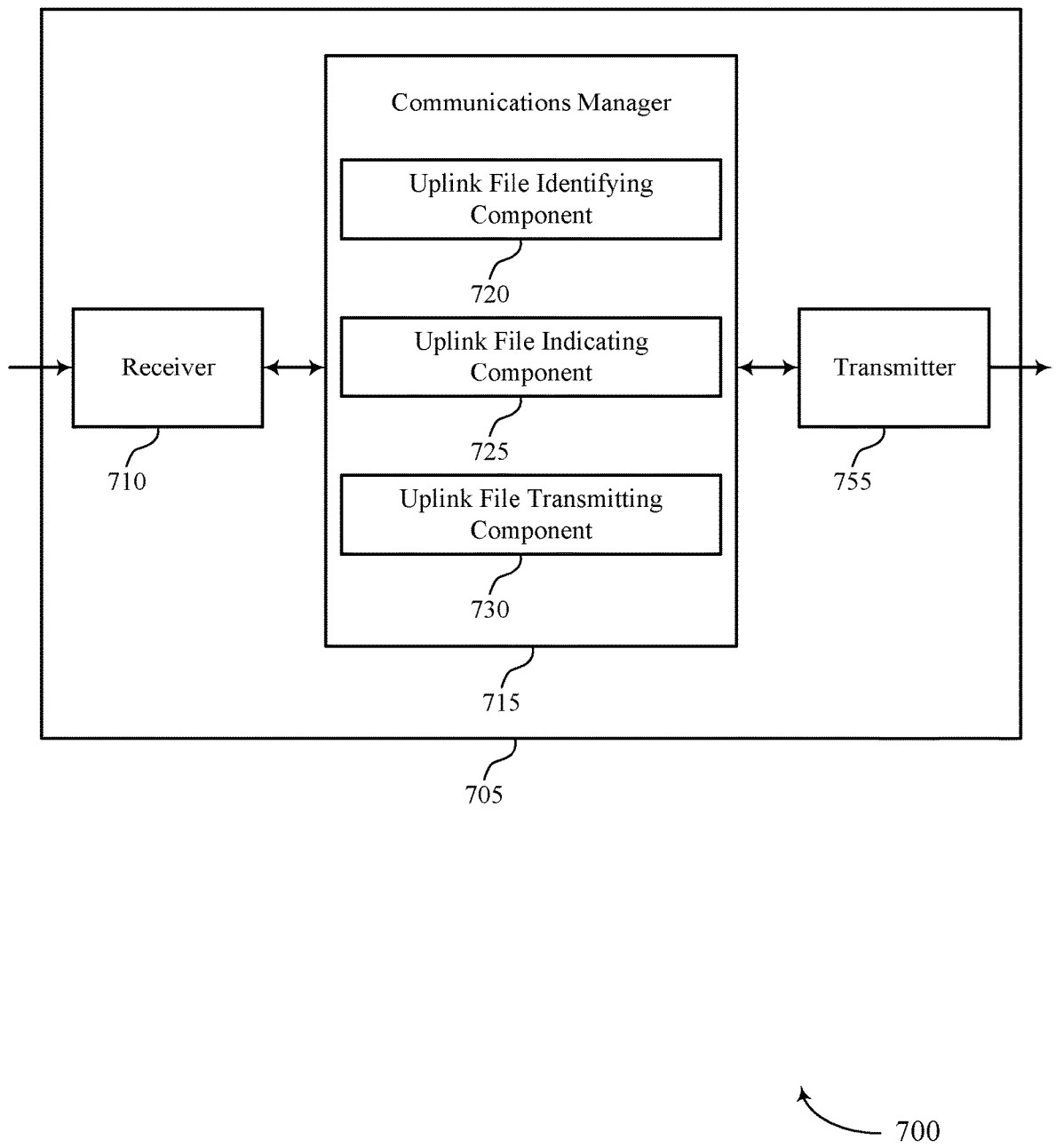

FIG. 7 shows a block diagram 700 of a device 705 that supports techniques for buffering a file in accordance with aspects of the present disclosure. The device 705 may be an example of aspects of a device 605, or a UE 115 as described herein. The device 705 may include a receiver 710, a communications manager 715, and a transmitter 755. The device 705 may also include a processor. Each of these components may be in communication with one another (e.g., via one or more buses).

The receiver 710 may receive information such as packets, user data, or control information associated with various information channels (e.g., control channels, data channels, and information related to techniques for buffering a file, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an uplink file identifying component 720, an uplink file indicating component 725, and an uplink file transmitting component 730. The communications manager 715 may be an example of aspects of the communications manager 910 described herein.

The uplink file identifying component 720 may identify that the UE includes in a buffer a file having a set of uplink packets that are configured to be processed together. The uplink file indicating component 725 may transmit an indication to a base station that the buffer includes the file. The uplink file transmitting component 730 may transmit, to the base station, the file via a batch of transmissions according to a resource allocation scheme for the batch of transmissions.

The transmitter 755 may transmit signals generated by other components of the device 705. In some examples, the transmitter 755 may be collocated with a receiver 710 in a transceiver module. For example, the transmitter 755 may be an example of aspects of the transceiver 920 described with reference to FIG. 9. The transmitter 755 may utilize a single antenna or a set of antennas.

Figure 8:
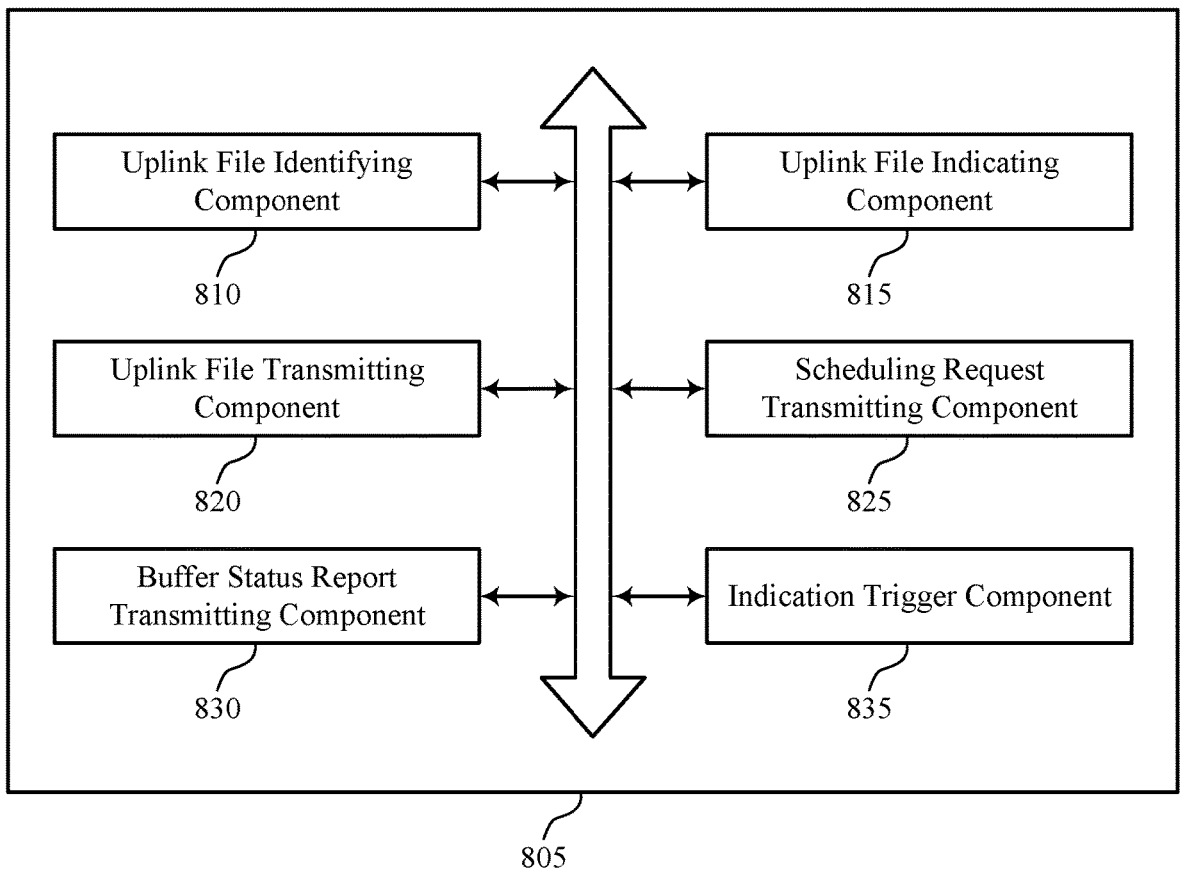
FIG. 8 shows a block diagram of a communications manager that supports techniques for buffering a file in accordance with aspects of the present disclosure.

FIG. 8 shows a block diagram 800 of a communications manager 805 that supports techniques for buffering a file in accordance with aspects of the present disclosure. The communications manager 805 may be an example of aspects of a communications manager 615, a communications manager 715, or a communications manager 910 described herein. The communications manager 805 may include an uplink file identifying component 810, an uplink file indicating component 815, an uplink file transmitting component 820, a scheduling request transmitting component 825, a buffer status report transmitting component 830, and an indication trigger component 835. Each of these modules may communicate, directly or indirectly, with one another (e.g., via one or more buses).

The uplink file identifying component 810 may identify that the UE includes in a buffer a file having a set of uplink packets that are configured to be processed together. The uplink file indicating component 815 may transmit an indication to a base station that the buffer includes the file. The uplink file transmitting component 820 may transmit, to the base station, the file via a batch of transmissions according to a resource allocation scheme for the batch of transmissions.

The scheduling request transmitting component 825 may transmit a scheduling request indicating that the file is stored in the buffer. In some examples, the scheduling request transmitting component 825 may jointly encode the scheduling request with a non-file based scheduling request. In some examples, the scheduling request transmitting component 825 may multiplex the scheduling request with one or more additional scheduling requests. In some cases, the non-file based scheduling request indicates a separate uplink transmission, where the separate uplink transmission is pending transmission. In some cases, the scheduling request has a higher priority than the one or more additional scheduling requests.

The buffer status report transmitting component 830 may transmit a buffer status report indicating that the file is stored in the buffer. In some examples, the buffer status report transmitting component 830 may indicate a total number of a set of buffered uplink files at the UE and a corresponding file size for each of the set of buffered uplink files.

In some examples, the buffer status report transmitting component 830 may indicate a total size of buffered uplink transmissions at the UE, where the size of the file is a portion of the total size of buffered uplink transmissions. In some cases, the buffer status report indicates a size of the file. In some cases, the buffer status report further indicates a non-file based uplink transmission. The indication trigger component 835 may detect a trigger to transmit the indication to the base station, where the indication is transmitted based on detecting the trigger.

Figure 9:
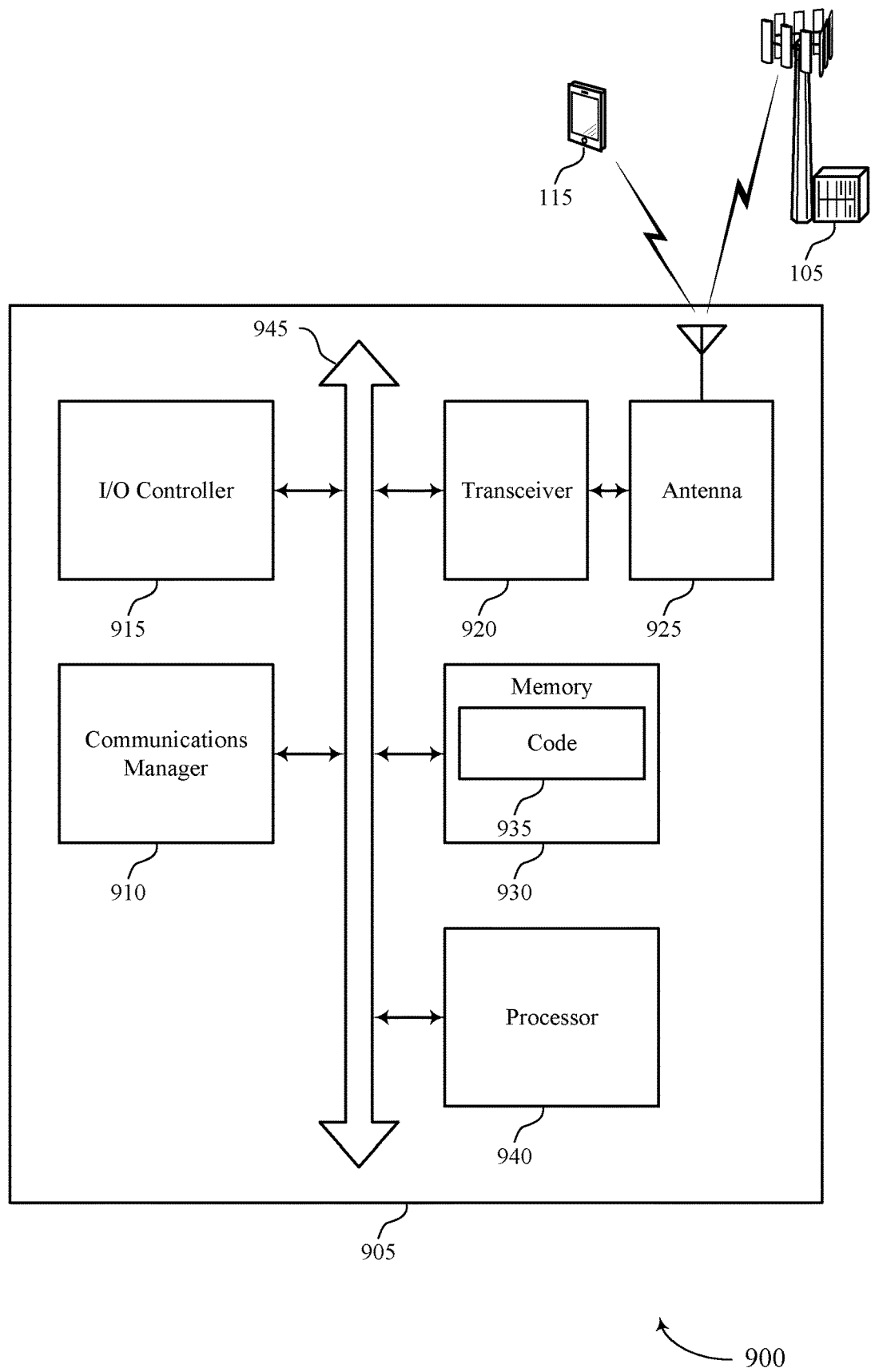
FIG. 9 shows a diagram of a system including a device that supports techniques for buffering a file in accordance with aspects of the present disclosure.

FIG. 9 shows a diagram of a system 900 including a device 905 that supports techniques for buffering a file in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify that the UE includes in a buffer a file having a set of uplink packets that are configured to be processed together, transmit an indication to a base station that the buffer includes the file, and transmit, to the base station, the file via a batch of transmissions according to a resource allocation scheme for the batch of transmissions.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a Basic Input/Output System (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for buffering a file).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
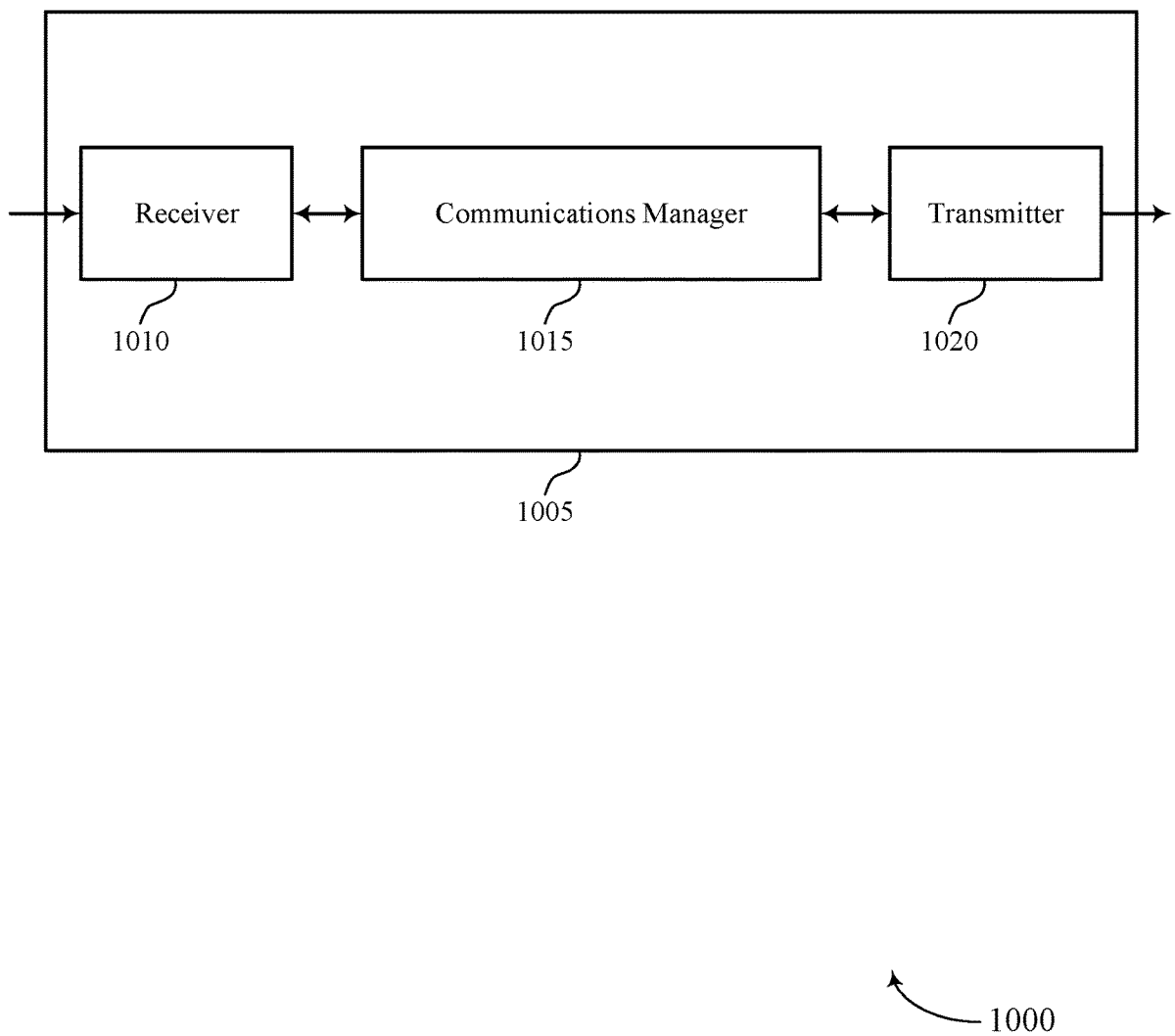
FIGS. 10 and 11 show block diagrams of devices that support techniques for buffering a file in accordance with aspects of the present disclosure.

FIG. 10 shows a block diagram 1000 of a device 1005 that supports techniques for buffering a file in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for buffering a file, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive an indication that a UE includes, in a buffer, a file having a set of uplink packets that are configured to be processed together and receive, from the UE, the file via a batch of transmissions according to a resource allocation scheme for the batch of transmissions. The communications manager 1015 may also identify a file having a set of packets that are configured to be processed together, determine a segmentation scheme for the file based on a size of the file, identify a batch of assignments for communicating the file via a batch of transmissions based on the segmentation scheme, and communicate the file via the batch of transmissions with the UE during the batch of assignments. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 1015 as described herein may be implemented to realize one or more potential advantages. One implementation may allow a base station 105 to efficiently assign resources to a UE 115 for the UE 115 to transmit an uplink file. For example, without the UE 115 indicating a number of pending uplink transmissions stored in a buffer at the UE 115, or a size of those pending uplink transmissions, the base station 105 may not efficiently be able to determine a resource allocation scheme. By the UE 115 reporting the number of and size of pending uplink transmissions, the base station 105 may make more efficient scheduling decisions. The techniques may enable the UE 115 to consider factors such as cell loading, rate adaptation, and a QoS requirement for the file when segmenting the file.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
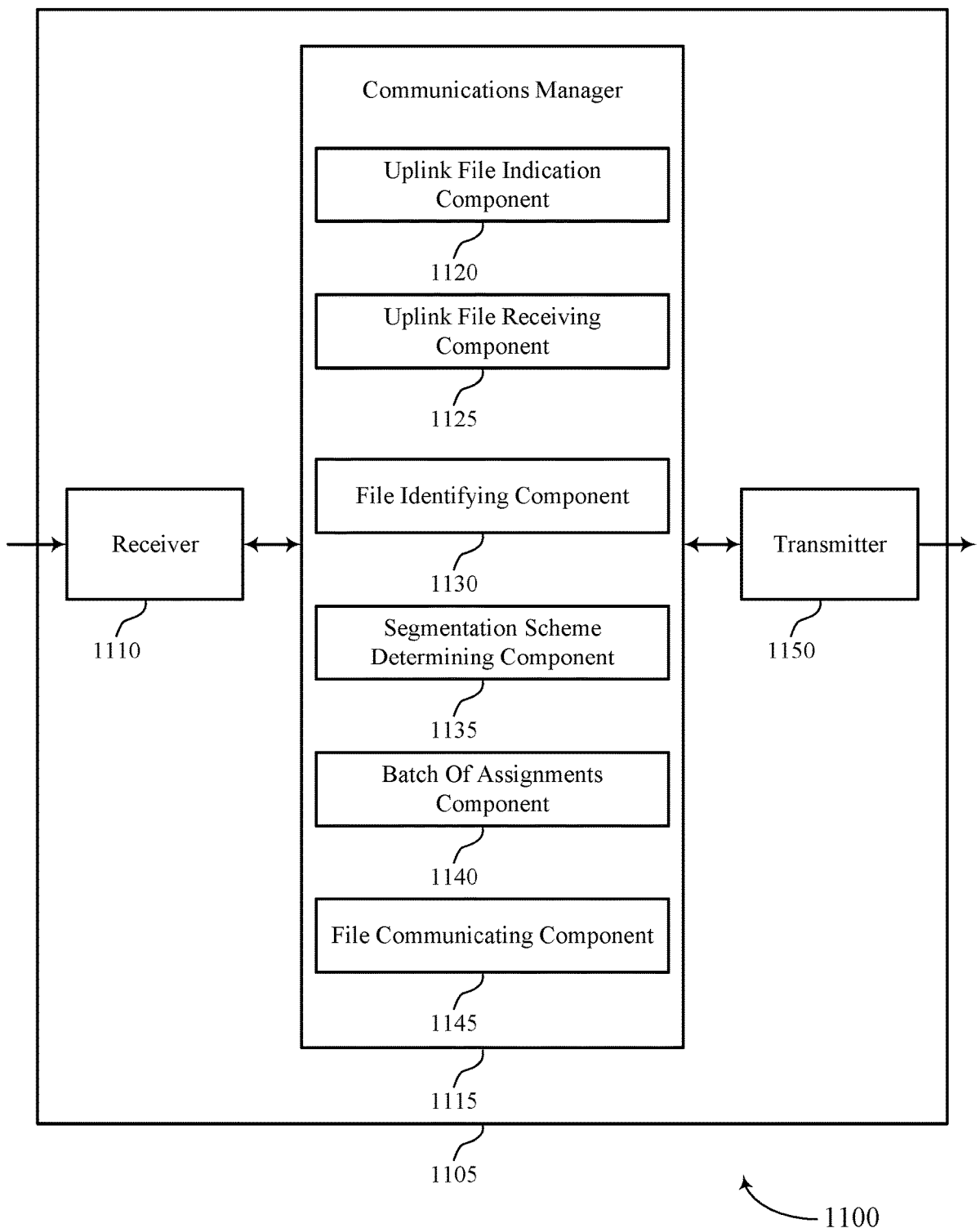

FIG. 11 shows a block diagram 1100 of a device 1105 that supports techniques for buffering a file in accordance with aspects of the present disclosure. The device 1105 may be an example of aspects of a device 1005, or a base station 105 as described herein. The device 1105 may include a receiver 1110, a communications manager 1115, and a transmitter 1150. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for buffering a file, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an uplink file indication component 1120, an uplink file receiving component 1125, a file identifying component 1130, a segmentation scheme determining component 1135, a batch of assignments component 1140, and a file communicating component 1145. The communications manager 1115 may be an example of aspects of the communications manager 1310 described herein.

The uplink file indication component 1120 may receive an indication that a UE includes, in a buffer, a file having a set of uplink packets that are configured to be processed together. The uplink file receiving component 1125 may receive, from the UE, the file via a batch of transmissions according to a resource allocation scheme for the batch of transmissions.

The file identifying component 1130 may identify a file having a set of packets that are configured to be processed together. The segmentation scheme determining component 1135 may determine a segmentation scheme for the file based on a size of the file. The batch of assignments component 1140 may identify a batch of assignments for communicating the file via a batch of transmissions based on the segmentation scheme. The file communicating component 1145 may communicate the file via the batch of transmissions with the UE during the batch of assignments.

The transmitter 1150 may transmit signals generated by other components of the device 1105. In some examples, the transmitter 1150 may be collocated with a receiver 1110 in a transceiver module. For example, the transmitter 1150 may be an example of aspects of the transceiver 1320 described with reference to FIG. 13. The transmitter 1150 may utilize a single antenna or a set of antennas.

Figure 12:
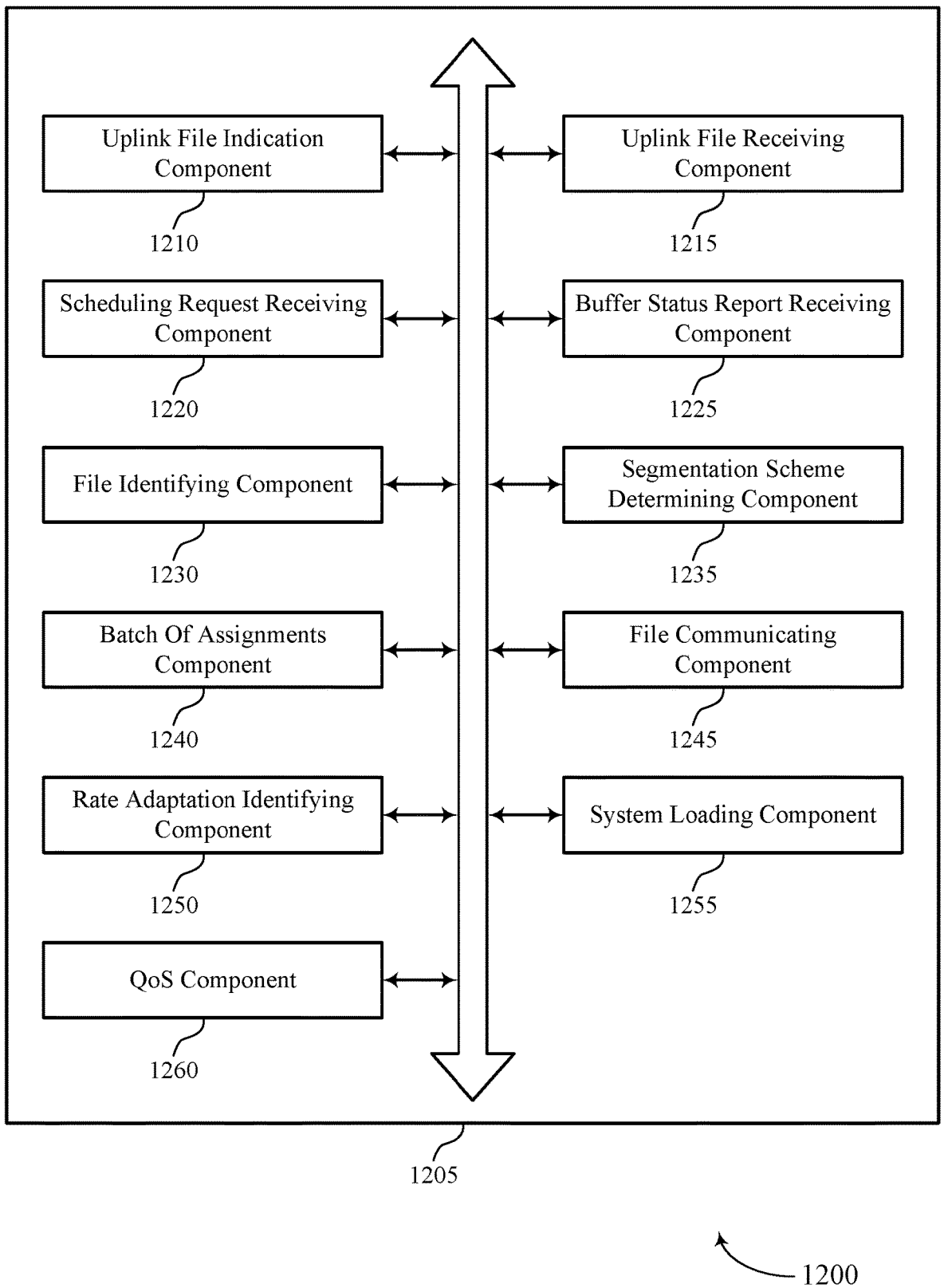
FIG. 12 shows a block diagram of a communications manager that supports techniques for buffering a file in accordance with aspects of the present disclosure.

FIG. 12 shows a block diagram 1200 of a communications manager 1205 that supports techniques for buffering a file in accordance with aspects of the present disclosure. The communications manager 1205 may be an example of aspects of a communications manager 1015, a communications manager 1115, or a communications manager 1310 described herein. The communications manager 1205 may include an uplink file indication component 1210, an uplink file receiving component 1215, a scheduling request receiving component 1220, and a buffer status report receiving component 1225, a file identifying component 1230, a segmentation scheme determining component 1235, a batch of assignments component 1240, a file communicating component 1245, a rate adaptation identifying component 1250, a system loading component 1255, and a QoS component 1260. Each of these modules may communicate, directly or indirectly, with one another (e.g., via one or more buses).

The uplink file indication component 1210 may receive an indication that a UE includes, in a buffer, a file having a set of uplink packets that are configured to be processed together.

The uplink file receiving component 1215 may receive, from the UE, the file via a batch of transmissions according to a resource allocation scheme for the batch of transmissions. The scheduling request receiving component 1220 may receive a scheduling request indicating that the file is stored in the buffer. In some examples, the scheduling request receiving component 1220 may identify that the scheduling request is jointly encoded with a non-file based scheduling request. In some examples, the scheduling request receiving component 1220 may decode the scheduling request based on the joint encoding. In some cases, the non-file based scheduling request indicates a separate uplink transmission, where the separate uplink transmission is pending transmission.

In some examples, the scheduling request receiving component 1220 may determine the scheduling request is multiplexed with one or more additional scheduling requests. In some examples, the scheduling request receiving component 1220 may decode the scheduling request based on the multiplexing. In some cases, the scheduling request has a higher priority than the one or more additional scheduling requests.

The buffer status report receiving component 1225 may receive a buffer status report indicating that the file is stored in the buffer. In some cases, the buffer status report indicates a size of the file. In some examples, the buffer status report receiving component 1225 may identify, based on the buffer status report, a total number of a set of buffered uplink files at the UE and a corresponding file size for each of the set of buffered uplink files. In some examples, the buffer status report receiving component 1225 may identify a total size of buffered uplink transmissions at the UE based on the buffer status report, where the size of the file is a portion of the total size of buffered uplink transmissions. In some cases, the buffer status report further indicates a non-file based uplink transmission.

The file identifying component 1230 may identify a file having a set of packets that are configured to be processed together. The segmentation scheme determining component 1235 may determine a segmentation scheme for the file based on a size of the file. In some examples, the segmentation scheme determining component 1235 may determine a maximum transmission size for communicating the file. In some examples, the segmentation scheme determining component 1235 may determine, based on the maximum transmission size, a maximum segment size for the batch of assignments to transmit a segment of the file.

The batch of assignments component 1240 may identify a batch of assignments for communicating the file via a batch of transmissions based on the segmentation scheme. In some examples, the batch of assignments component 1240 may communicate an initial repetition of the file during an initial slot of the set of slots.

In some examples, the batch of assignments component 1240 may communicate one or more additional repetitions of the file during a corresponding one or more additional slots of the set of slots. In some examples, the batch of assignments component 1240 may communicate a first segment of the file in a first assignment of the batch of assignments. In some examples, the batch of assignments component 1240 may communicate one or more additional segments of the file in a corresponding one or more additional assignments of the batch of assignments.

In some examples, the batch of assignments component 1240 may communicate the file as a single transport block over the set of component carriers. In some cases, the batch of assignments span a set of slots. In some cases, the file is communicated in a single transport block spanning the set of slots. In some cases, the batch of assignments span a set of component carriers.

The file communicating component 1245 may communicate the file via the batch of transmissions with the UE during the batch of assignments. In some examples, the file communicating component 1245 may communicate a HARQ feedback transmission including feedback for each segment of the file. In some examples, the file communicating component 1245 may transmit the batch of transmissions during the batch of assignments, where the file is a downlink transmission. In some examples, the file communicating component 1245 may transmit downlink control information to schedule the batch of assignments.

In some examples, the file communicating component 1245 may indicate the segmentation scheme based on the scheduling. In some examples, the file communicating component 1245 may schedule a set of transport blocks based on a configured grant transmission scheme, where the file is transmitted in the set of transport blocks. In some examples, the file communicating component 1245 may receive the batch of transmissions during the batch of assignments, where the file is an uplink transmission.

In some examples, the file communicating component 1245 may indicate the segmentation scheme to the UE. In some examples, the file communicating component 1245 may transmit, to the UE, downlink control information to schedule batch of assignments, where the downlink control information indicates that the batch of assignments are configured for the file.

In some examples, the file communicating component 1245 may transmit, to the UE, Radio Resource Control signaling to configure the batch of assignments as part of a configured grant scheme, where the batch of assignments are configured for the file. In some cases, each transport block of the set of transport blocks has a same transport block size. In some cases, each transport block of the set of transport blocks has a different transport block size. In some cases, a transport block size for the file is based on a resource size of the batch of assignments, a modulation and coding scheme, or a combination thereof.

The rate adaptation identifying component 1250 may identify one or more channel rate adaptation parameters, where the segmentation scheme is based on the one or more channel rate adaptation parameters. In some cases, the one or more channel rate adaptation parameters are based on a target block error rate (BLER) for the file, a channel bandwidth, mobility of the UE, CSI, or any combination thereof.

The system loading component 1255 may identify a system loading for the base station, where the segmentation scheme is based on the system loading. In some cases, the segmentation scheme is based on a cell load of the base station at one or more slots corresponding to the batch of assignments. In some cases, the segmentation scheme is based on maintaining an even cell load when communicating the file.

The QoS component 1260 may identify a quality of service identifier for the file, where the segmentation scheme is based on the quality of service identifier. In some cases, the segmentation scheme is based on a delay budget for the file, a transmission of the batch of transmissions, a packet of a transmission, or a combination thereof.

Figure 13:
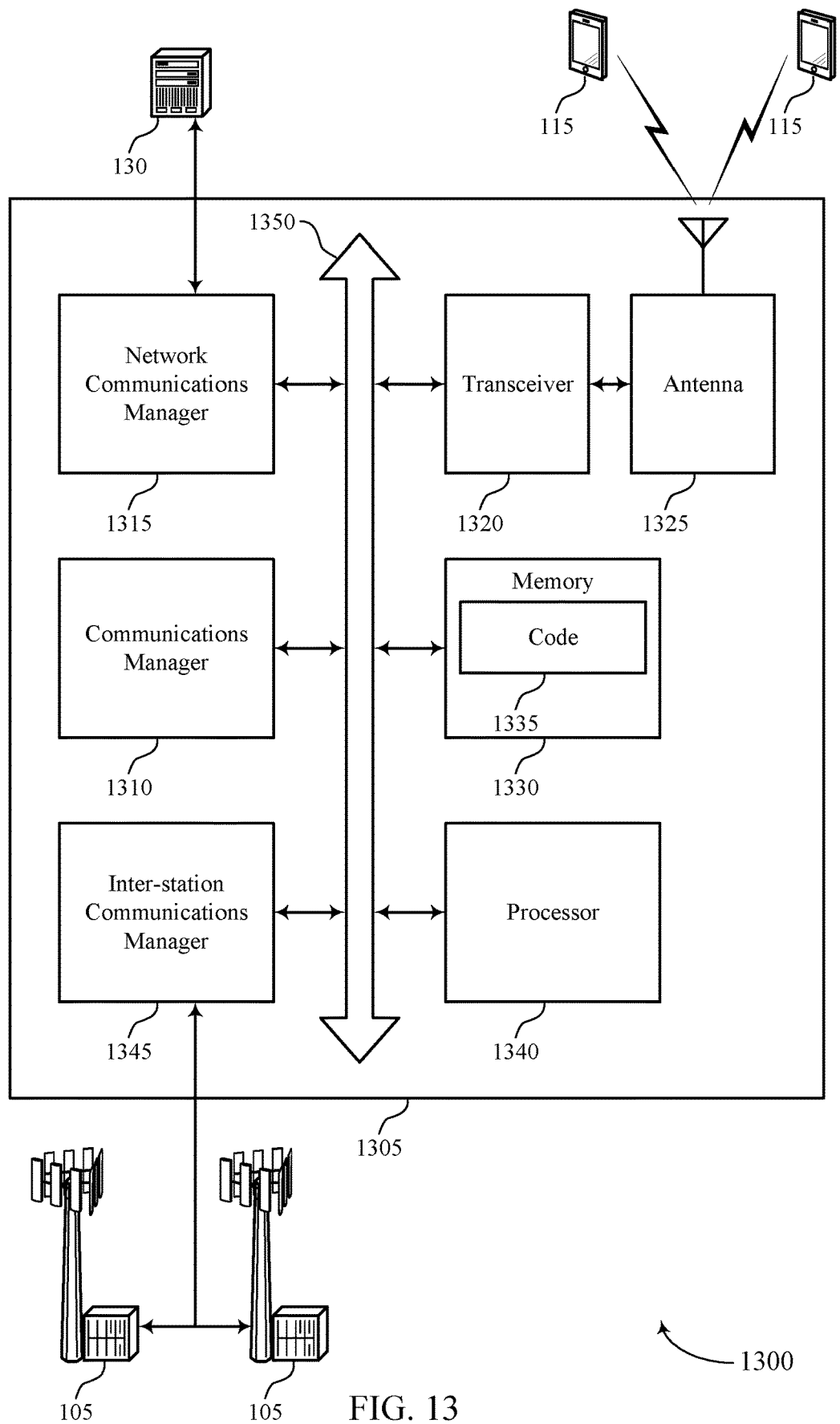
FIG. 13 shows a diagram of a system including a device that supports techniques for buffering a file in accordance with aspects of the present disclosure.

FIG. 13 shows a diagram of a system 1300 including a device 1305 that supports techniques for buffering a file in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive an indication that a UE includes, in a buffer, a file having a set of uplink packets that are configured to be processed together and receive, from the UE, the file via a batch of transmissions according to a resource allocation scheme for the batch of transmissions. The communications manager 1310 may also identify a file having a set of packets that are configured to be processed together, determine a segmentation scheme for the file based on a size of the file, identify a batch of assignments for communicating the file via a batch of transmissions based on the segmentation scheme, and communicate the file via the batch of transmissions with the UE during the batch of assignments.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting techniques for buffering a file).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
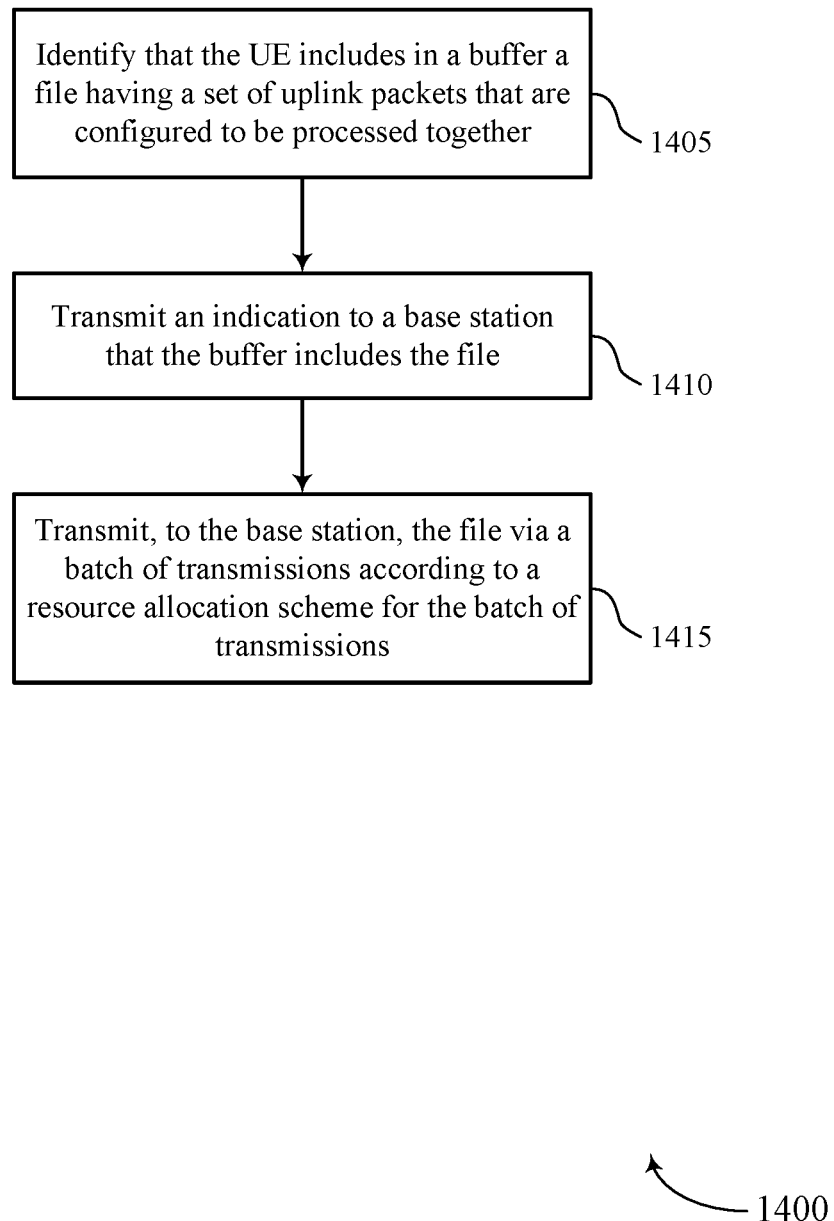
FIGS. 14 through 21 show flowcharts illustrating methods that support techniques for buffering a file in accordance with aspects of the present disclosure.

FIG. 14 shows a flowchart illustrating a method 1400 that supports techniques for buffering a file in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify that the UE includes in a buffer a file having a set of uplink packets that are configured to be processed together. The operations of 1405 may be performed according to the methods described herein. In some examples, aspects of the operations of 1405 may be performed by an uplink file identifying component as described with reference to FIGS. 6 through 9.

At 1410, the UE may transmit an indication to a base station that the buffer includes the file. The operations of 1410 may be performed according to the methods described herein. In some examples, aspects of the operations of 1410 may be performed by an uplink file indicating component as described with reference to FIGS. 6 through 9.

At 1415, the UE may transmit, to the base station, the file via a batch of transmissions according to a resource allocation scheme for the batch of transmissions. The operations of 1415 may be performed according to the methods described herein. In some examples, aspects of the operations of 1415 may be performed by an uplink file transmitting component as described with reference to FIGS. 6 through 9.

Figure 15:
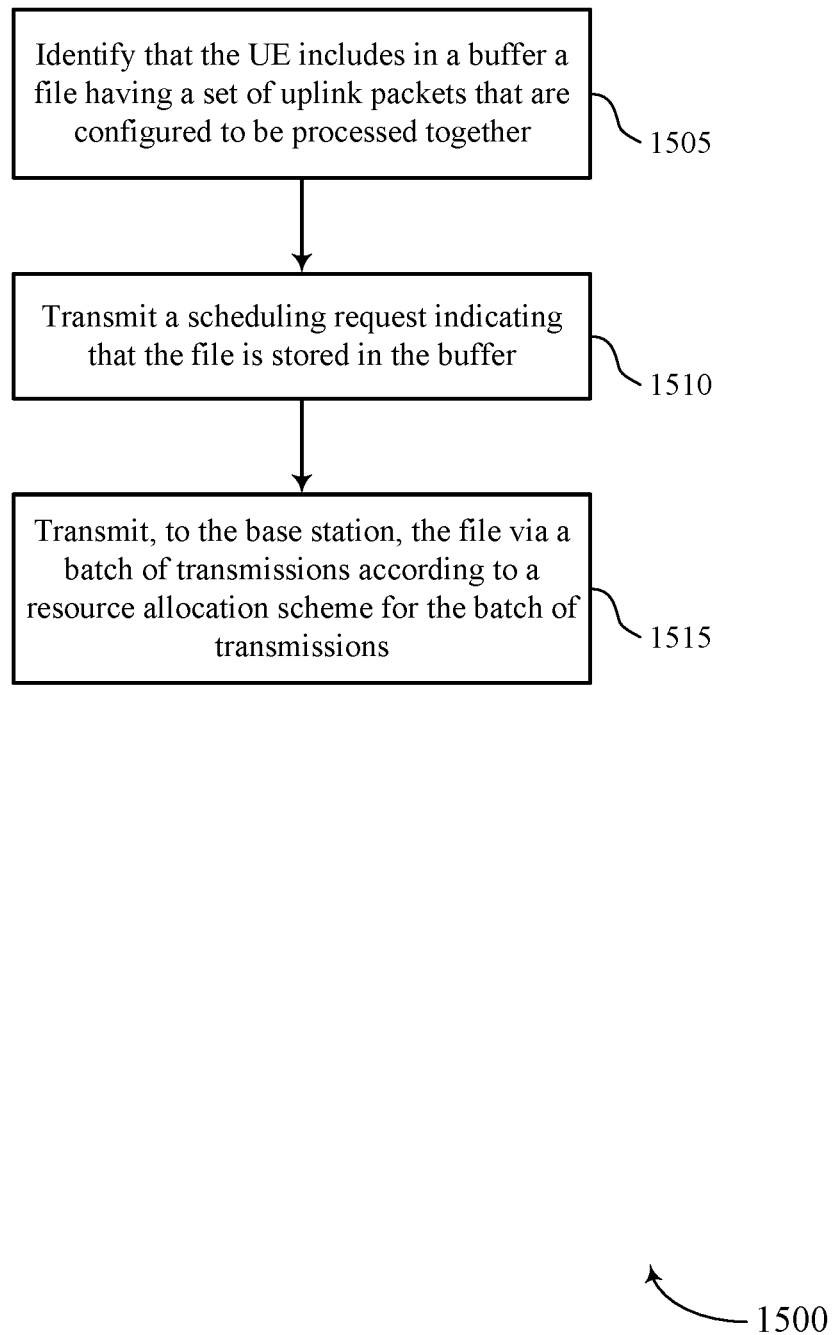

FIG. 15 shows a flowchart illustrating a method 1500 that supports techniques for buffering a file in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify that the UE includes in a buffer a file having a set of uplink packets that are configured to be processed together. The operations of 1505 may be performed according to the methods described herein. In some examples, aspects of the operations of 1505 may be performed by an uplink file identifying component as described with reference to FIGS. 6 through 9.

At 1510, the UE may transmit a scheduling request indicating that the file is stored in the buffer. The operations of 1510 may be performed according to the methods described herein. In some examples, aspects of the operations of 1510 may be performed by a scheduling request transmitting component as described with reference to FIGS. 6 through 9.

At 1515, the UE may transmit an indication to a base station that the buffer includes the file. The operations of 1515 may be performed according to the methods described herein. In some examples, aspects of the operations of 1515 may be performed by an uplink file indicating component as described with reference to FIGS. 6 through 9.

At 1520, the UE may transmit, to the base station, the file via a batch of transmissions according to a resource allocation scheme for the batch of transmissions. The operations of 1520 may be performed according to the methods described herein. In some examples, aspects of the operations of 1520 may be performed by an uplink file transmitting component as described with reference to FIGS. 6 through 9.

Figure 16:
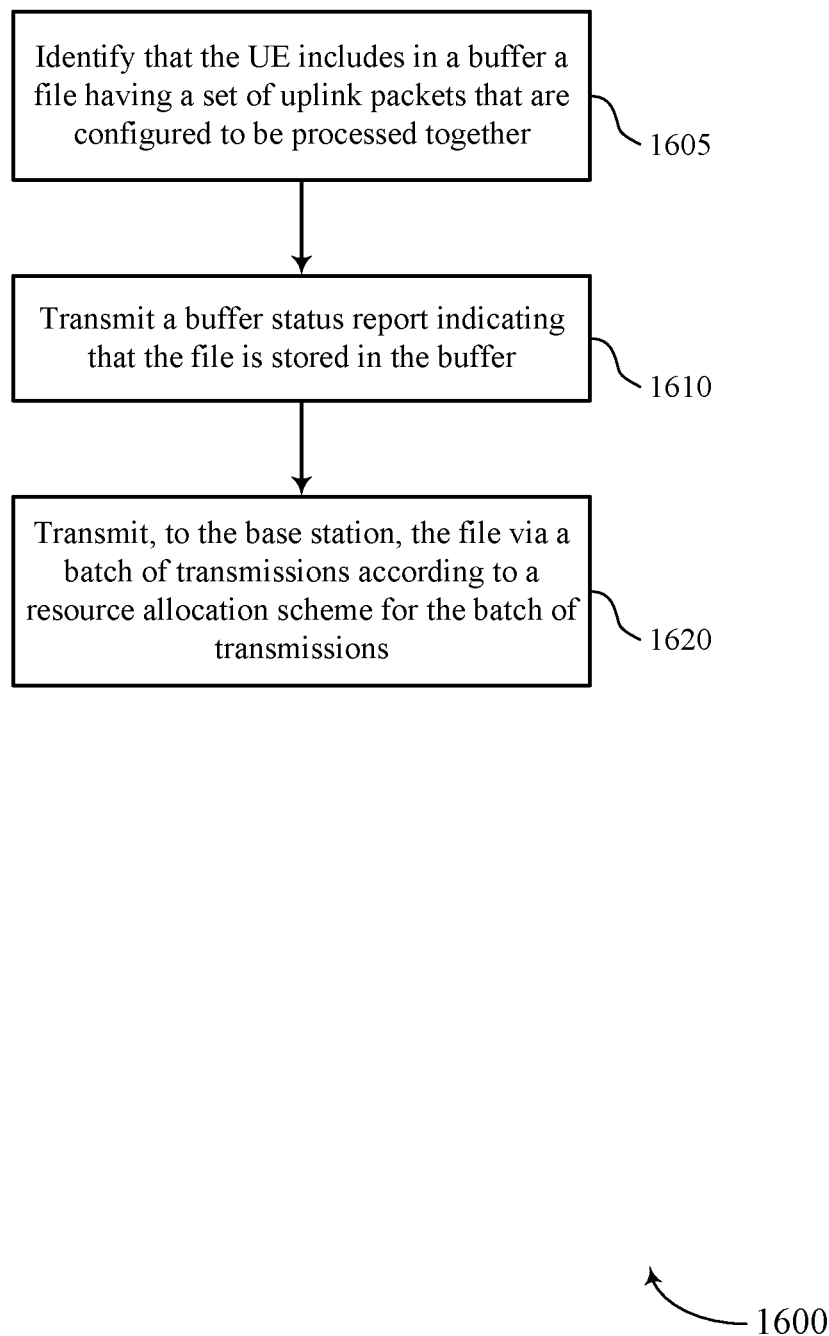

FIG. 16 shows a flowchart illustrating a method 1600 that supports techniques for buffering a file in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may identify that the UE includes in a buffer a file having a set of uplink packets that are configured to be processed together. The operations of 1605 may be performed according to the methods described herein. In some examples, aspects of the operations of 1605 may be performed by an uplink file identifying component as described with reference to FIGS. 6 through 9.

At 1610, the UE may transmit a buffer status report indicating that the file is stored in the buffer. The operations of 1610 may be performed according to the methods described herein. In some examples, aspects of the operations of 1610 may be performed by a buffer status report transmitting component as described with reference to FIGS. 6 through 9.

At 1615, the UE may transmit an indication to a base station that the buffer includes the file. The operations of 1615 may be performed according to the methods described herein. In some examples, aspects of the operations of 1615 may be performed by an uplink file indicating component as described with reference to FIGS. 6 through 9.

At 1620, the UE may transmit, to the base station, the file via a batch of transmissions according to a resource allocation scheme for the batch of transmissions. The operations of 1620 may be performed according to the methods described herein. In some examples, aspects of the operations of 1620 may be performed by an uplink file transmitting component as described with reference to FIGS. 6 through 9.

Figure 17:
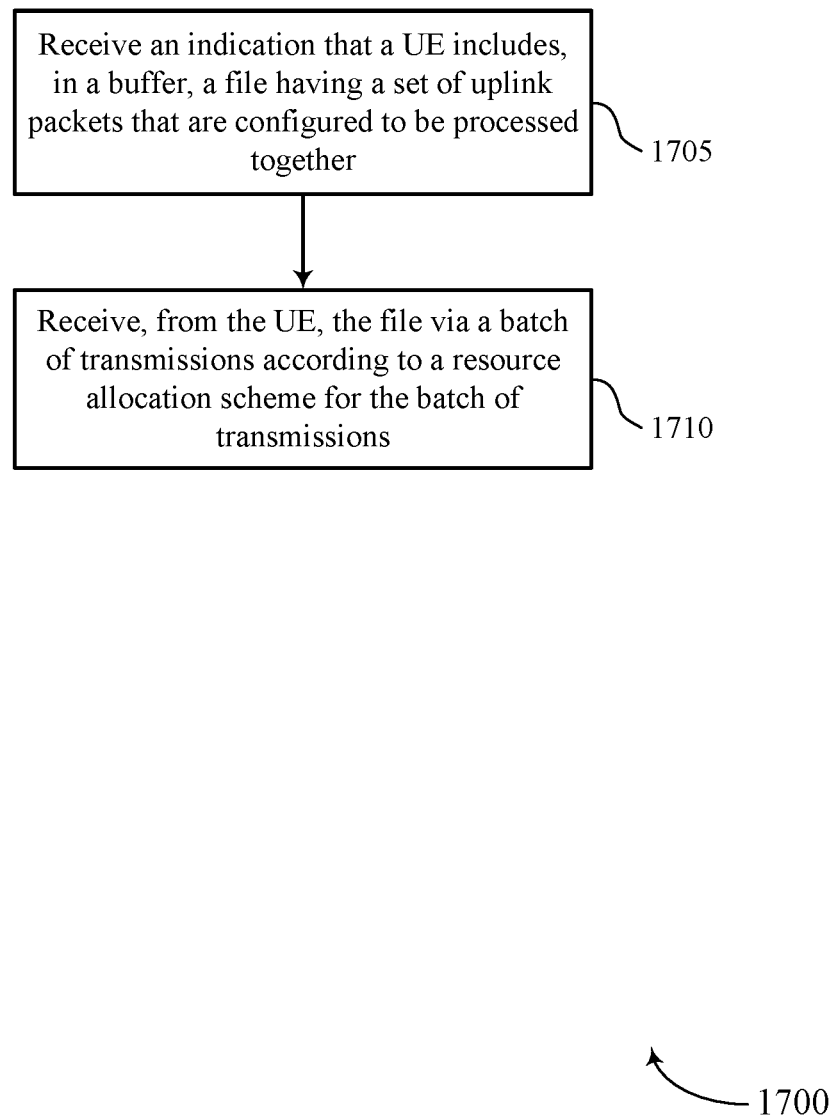

FIG. 17 shows a flowchart illustrating a method 1700 that supports techniques for buffering a file in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may receive an indication that a UE includes, in a buffer, a file having a set of uplink packets that are configured to be processed together. The operations of 1705 may be performed according to the methods described herein. In some examples, aspects of the operations of 1705 may be performed by an uplink file indication component as described with reference to FIGS. 10 through 13.

At 1710, the base station may receive, from the UE, the file via a batch of transmissions according to a resource allocation scheme for the batch of transmissions. The operations of 1710 may be performed according to the methods described herein. In some examples, aspects of the operations of 1710 may be performed by an uplink file receiving component as described with reference to FIGS. 10 through 13.

Figure 18:
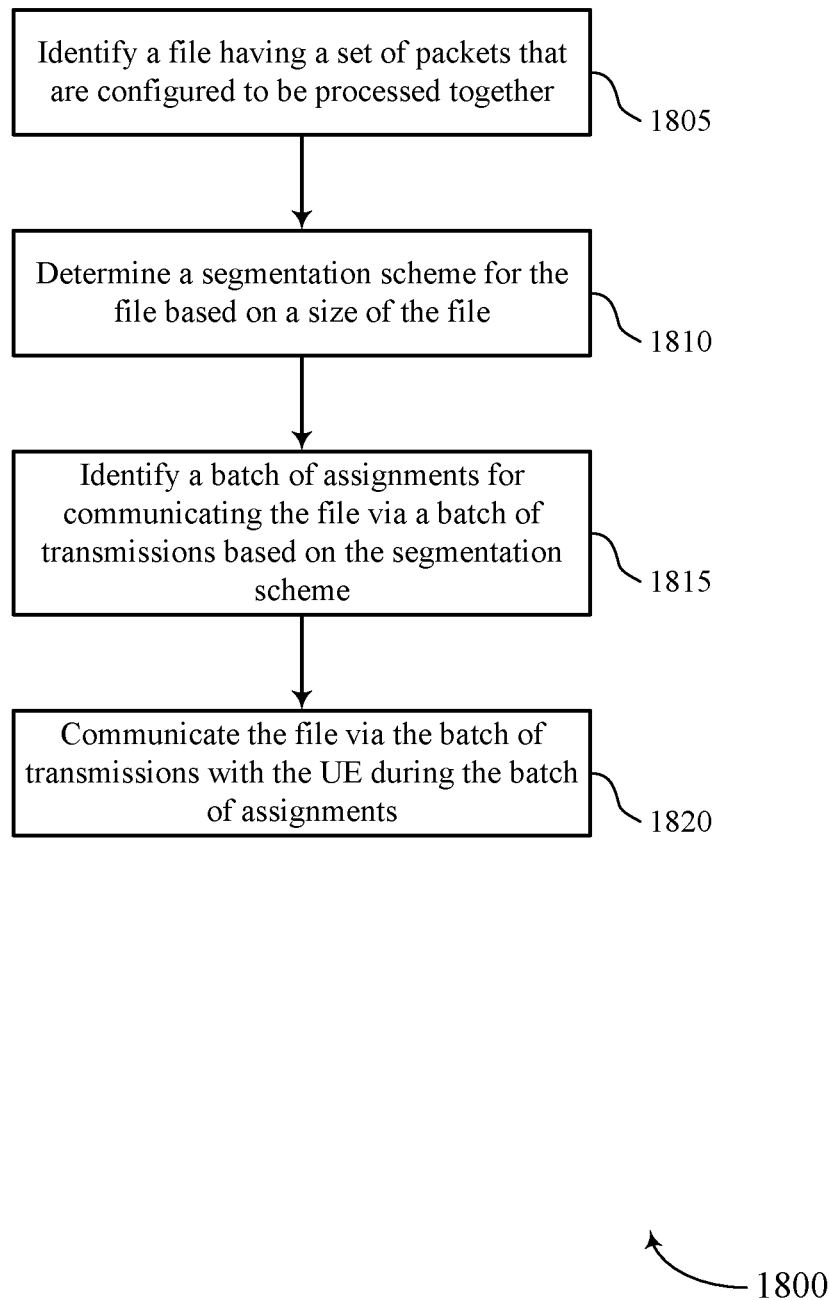

FIG. 18 shows a flowchart illustrating a method 1800 that supports techniques for buffering a file in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below.

Additionally or alternatively, a base station may perform aspects of the functions described below using special-purpose hardware.

At 1805, the base station may identify a file having a set of packets that are configured to be processed together. The operations of 1805 may be performed according to the methods described herein. In some examples, aspects of the operations of 1805 may be performed by a file identifying component as described with reference to FIGS. 10 through 13.

At 1810, the base station may determine a segmentation scheme for the file based on a size of the file. The operations of 1810 may be performed according to the methods described herein. In some examples, aspects of the operations of 1810 may be performed by a segmentation scheme determining component as described with reference to FIGS. 10 through 13.

At 1815, the base station may identify a batch of assignments for communicating the file via a batch of transmissions based on the segmentation scheme. The operations of 1815 may be performed according to the methods described herein. In some examples, aspects of the operations of 1815 may be performed by a batch of assignments component as described with reference to FIGS. 10 through 13.

At 1820, the base station may communicate the file via the batch of transmissions with the UE during the batch of assignments. The operations of 1820 may be performed according to the methods described herein. In some examples, aspects of the operations of 1820 may be performed by a file communicating component as described with reference to FIGS. 6 through 9.

Figure 19:
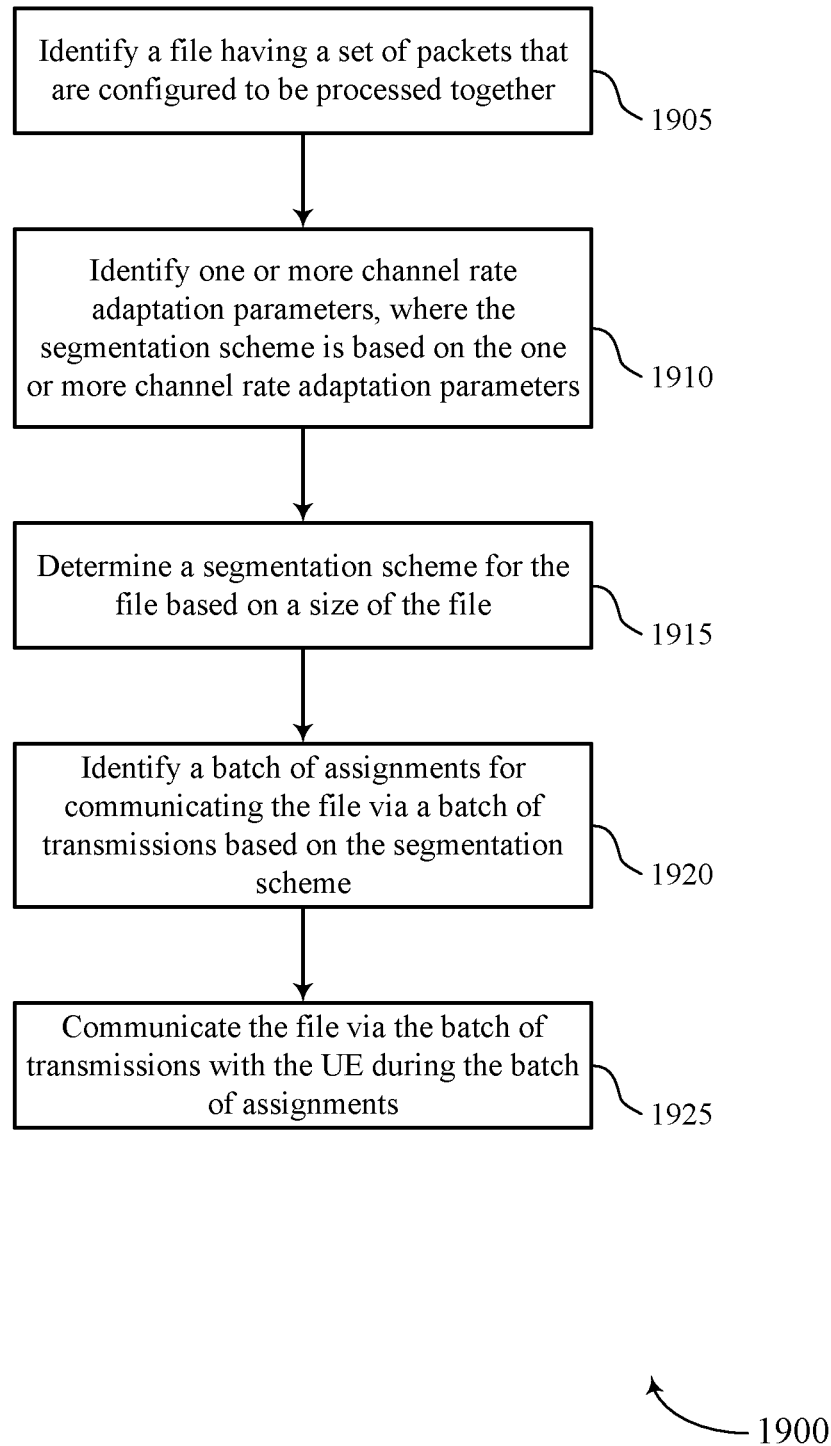

FIG. 19 shows a flowchart illustrating a method 1900 that supports techniques for buffering a file in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may identify a file having a set of packets that are configured to be processed together. The operations of 1905 may be performed according to the methods described herein. In some examples, aspects of the operations of 1905 may be performed by a file identifying component as described with reference to FIGS. 10 through 13.

At 1910, the base station may identify one or more channel rate adaptation parameters, where the segmentation scheme is based on the one or more channel rate adaptation parameters. The operations of 1910 may be performed according to the methods described herein. In some examples, aspects of the operations of 1910 may be performed by a rate adaptation identifying component as described with reference to FIGS. 10 through 13.

At 1915, the base station may determine a segmentation scheme for the file based on a size of the file. The operations of 1915 may be performed according to the methods described herein. In some examples, aspects of the operations of 1915 may be performed by a segmentation scheme determining component as described with reference to FIGS. 10 through 13.

At 1920, the base station may identify a batch of assignments for communicating the file via a batch of transmissions based on the segmentation scheme. The operations of 1920 may be performed according to the methods described herein. In some examples, aspects of the operations of 1920 may be performed by a batch of assignments component described with reference to FIGS. 10 through 13.

At 1925, the UE may communicate the file via the batch of transmissions with the UE during the batch of assignments. The operations of 1925 may be performed according to the methods described herein. In some examples, aspects of the operations of 1925 may be performed by a file communicating component as described with reference to FIGS. 10 through 13.

Figure 20:
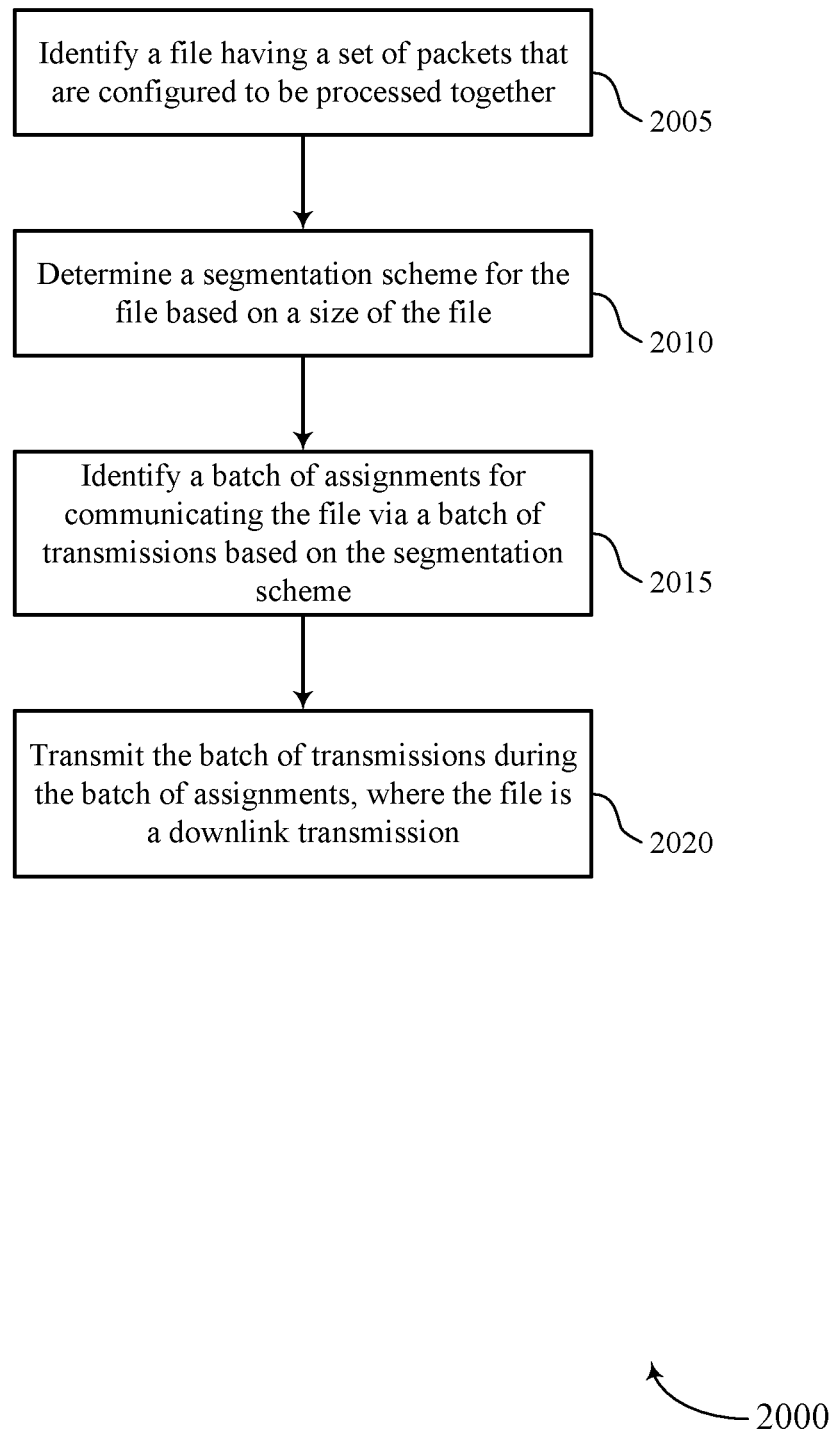

FIG. 20 shows a flowchart illustrating a method 2000 that supports techniques for buffering a file in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may identify a file having a set of packets that are configured to be processed together. The operations of 2005 may be performed according to the methods described herein. In some examples, aspects of the operations of 2005 may be performed by a file identifying component as described with reference to FIGS. 6 through 9.

At 2010, the base station may determine a segmentation scheme for the file based on a size of the file. The operations of 2010 may be performed according to the methods described herein. In some examples, aspects of the operations of 2010 may be performed by a segmentation scheme determining component as described with reference to FIGS. 10 through 13.

At 2015, the base station may identify a batch of assignments for communicating the file via a batch of transmissions based on the segmentation scheme. The operations of 2015 may be performed according to the methods described herein. In some examples, aspects of the operations of 2015 may be performed by a batch of assignments component as described with reference to FIGS. 10 through 13.

At 2020, the base station may transmit the batch of transmissions during the batch of assignments, where the file is a downlink transmission. The operations of 2020 may be performed according to the methods described herein. In some examples, aspects of the operations of 2020 may be performed by a file communicating component as described with reference to FIGS. 10 through 13.

At 2025, the base station may communicate the file via the batch of transmissions with the UE during the batch of assignments. The operations of 2025 may be performed according to the methods described herein. In some examples, aspects of the operations of 2025 may be performed by a file communicating component as described with reference to FIGS. 10 through 13.

Figure 21:
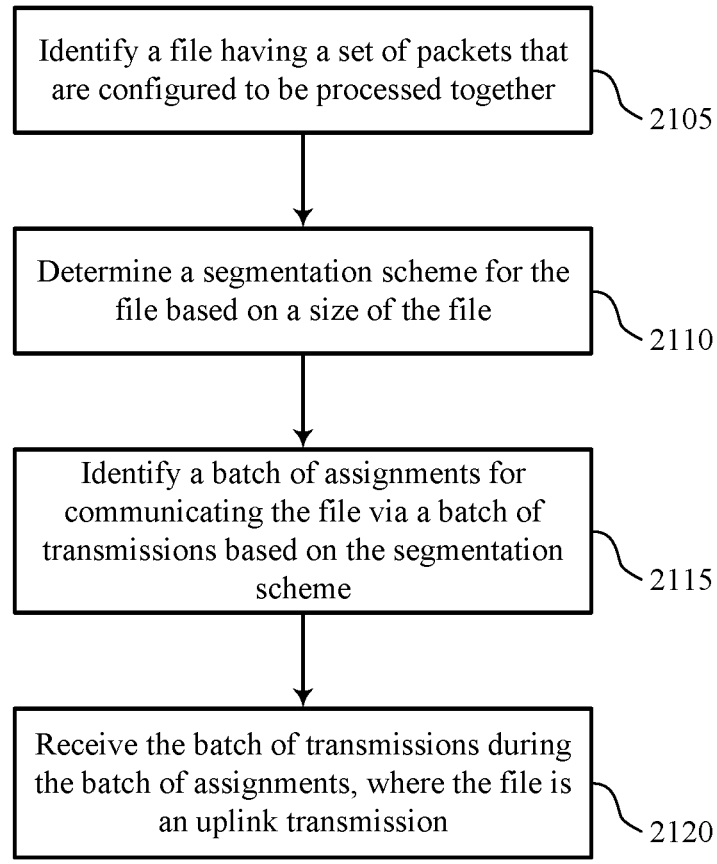

FIG. 21 shows a flowchart illustrating a method 2100 that supports techniques for buffering a file in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may identify a file having a set of packets that are configured to be processed together. The operations of 2105 may be performed according to the methods described herein. In some examples, aspects of the operations of 2105 may be performed by a file identifying component as described with reference to FIGS. 10 through 13.

At 2110, the base station may determine a segmentation scheme for the file based on a size of the file. The operations of 2110 may be performed according to the methods described herein. In some examples, aspects of the operations of 2110 may be performed by a segmentation scheme determining component as described with reference to FIGS. 10 through 13.

At 2115, the base station may identify a batch of assignments for communicating the file via a batch of transmissions based on the segmentation scheme. The operations of 2115 may be performed according to the methods described herein. In some examples, aspects of the operations of 2115 may be performed by a batch of assignments component as described with reference to FIGS. 10 through 13.

At 2120, the base station may receive the batch of transmissions during the batch of assignments, where the file is an uplink transmission. The operations of 2120 may be performed according to the methods described herein. In some examples, aspects of the operations of 2120 may be performed by a file communicating component as described with reference to FIGS. 10 through 13.

At 2125, the base station may communicate the file via the batch of transmissions with the UE during the batch of assignments. The operations of 2125 may be performed according to the methods described herein. In some examples, aspects of the operations of 2125 may be performed by a file communicating component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying that the UE includes in a buffer a file having a plurality of uplink packets that are configured to be processed together by an application;
    transmitting a scheduling request indicating the file having the plurality of uplink packets that are configured to be processed together is stored in the buffer; and
    transmitting, the file having the plurality of uplink packets that are configured to be processed together via a batch of transmissions according to a resource allocation scheme for the batch of transmissions.

2. The method of claim 1, further comprising:
    jointly encoding the scheduling request with a non-file based scheduling request.

3. The method of claim 2, wherein the non-file based scheduling request indicates a separate uplink transmission, wherein the separate uplink transmission is pending transmission.

4. The method of claim 1, further comprising:
    multiplexing the scheduling request with one or more additional scheduling requests.

5. The method of claim 4, wherein the scheduling request has a higher priority than the one or more additional scheduling requests.

6. The method of claim 1, wherein transmitting the scheduling request comprises:
    transmitting a buffer status report indicating that the file is stored in the buffer.

7. The method of claim 6, wherein the buffer status report indicates a size of the file.

8. The method of claim 7, further comprising:
    indicating a total number of a plurality of buffered uplink files at the UE and a corresponding file size for each of the plurality of buffered uplink files.

9. The method of claim 7, further comprising:
    indicating a total size of buffered uplink transmissions at the UE, wherein the size of the file is a portion of the total size of buffered uplink transmissions.

10. The method of claim 6, wherein the buffer status report further indicates a non-file based uplink transmission.

11. The method of claim 1, further comprising:
detecting a trigger to transmit the scheduling request, wherein the scheduling request is transmitted based at least in part on detecting the trigger.

12. A method for wireless communication at a network device, comprising:
receiving a scheduling request indicating that a user equipment (UE) includes, stored in a buffer, a file having a plurality of uplink packets that are configured to be processed together by an application; and
receiving, from the UE, the file having the plurality of uplink packets that are configured to be processed together via a batch of transmissions according to a resource allocation scheme for the batch of transmissions.

13. The method of claim 12, further comprising:
identifying that the scheduling request is jointly encoded with a non-file based scheduling request; and
decoding the scheduling request based at least in part on the joint encoding.

14. The method of claim 13, wherein the non-file based scheduling request indicates a separate uplink transmission, wherein the separate uplink transmission is pending transmission.

15. The method of claim 12, further comprising:
determining the scheduling request is multiplexed with one or more additional scheduling requests; and
decoding the scheduling request based at least in part on the multiplexing.

16. The method of claim 15, wherein the scheduling request has a higher priority than the one or more additional scheduling requests.

17. The method of claim 12, wherein receiving the scheduling request comprises:
receiving a buffer status report indicating that the file is stored in the buffer.

18. The method of claim 17, wherein the buffer status report indicates a size of the file.

19. The method of claim 18, further comprising:
identifying, based at least in part on the buffer status report, a total number of a plurality of buffered uplink files at the UE and a corresponding file size for each of the plurality of buffered uplink files.

20. The method of claim 18, further comprising:
identifying a total size of buffered uplink transmissions at the UE based at least in part on the buffer status report, wherein the size of the file is a portion of the total size of buffered uplink transmissions.

21. The method of claim 17, wherein the buffer status report further indicates a non-file based uplink transmission.

22. A method for wireless communications at a network device, comprising:
identifying a file having a plurality of packets that are configured to be processed together by an application;
determining a segmentation scheme for the file based at least in part on a size of the file;
identifying a batch of assignments for communicating the file via a batch of transmissions based at least in part on the segmentation scheme; and
communicating the file via the batch of transmissions with a user equipment (UE) during the batch of assignments.

23. The method of claim 22, further comprising:
identifying one or more channel rate adaptation parameters, wherein the segmentation scheme is based at least in part on the one or more channel rate adaptation parameters.

24. The method of claim 23, wherein the one or more channel rate adaptation parameters are based at least in part on a target block error rate (BLER) for the file, a channel bandwidth, mobility of the UE, channel state information (CSI), or any combination thereof.

25. The method of claim 22, further comprising:
determining a maximum transmission size for communicating the file; and
determining, based at least in part on the maximum transmission size, a maximum segment size for the batch of assignments to transmit a segment of the file.

26. The method of claim 22, wherein communicating the file comprises:
transmitting the batch of transmissions during the batch of assignments, wherein the file is a downlink transmission.

27. The method of claim 22, wherein communicating the file comprises:
receiving the batch of transmissions during the batch of assignments, wherein the file is an uplink transmission.

28. An apparatus for wireless communication at a user equipment (UE), comprising:
a processor;
memory coupled with the processor; and
instructions stored in the memory and executable by the processor to cause the apparatus to:
identify that the UE includes in a buffer a file having a plurality of uplink packets that are configured to be processed together by an application;
transmit a scheduling request indicating the file having the plurality of uplink packets that are configured to be processed together is stored in the buffer; and
transmit, the file having the plurality of uplink packets that are configured to be processed together via a batch of transmissions according to a resource allocation scheme for the batch of transmissions.

\* \* \* \* \*